(12) United States Patent
Fujimoto et al.

(10) Patent No.: US 6,496,285 B1
(45) Date of Patent: Dec. 17, 2002

(54) IMAGE READING APPARATUS

(75) Inventors: Hisayoshi Fujimoto, Kyoto (JP); Hiroaki Onishi, Kyoto (JP); Toshihiko Takakura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/256,857

(22) Filed: Feb. 24, 1999

(30) Foreign Application Priority Data

Feb. 25, 1998 (JP) .......................................... 10-043269
Feb. 27, 1998 (JP) .......................................... 10-046564
Apr. 24, 1998 (JP) .......................................... 10-115167

(51) Int. Cl.[7] ................................................ H04N 1/04
(52) U.S. Cl. ...................................... 358/475; 358/483
(58) Field of Search ............................... 358/475, 509, 358/484, 487, 505, 506, 483, 485; 355/38, 40; 250/566; 362/217, 221

(56) References Cited

U.S. PATENT DOCUMENTS 5,748,287 A * 5/1998 Takahashi et al. ............ 355/40
5,768,663 A * 6/1998 Lin
5,950,053 A * 9/1999 Lin
6,122,038 A * 9/2000 Cilke et al. .................... 355/84
6,133,580 A * 10/2000 Sun ............................. 250/566

FOREIGN PATENT DOCUMENTS

JP    6-273602    9/1994
JP    8-88807     4/1996

* cited by examiner

*Primary Examiner*—Cheukfan Lee
(74) *Attorney, Agent, or Firm*—Merchant & Gould P.C.

(57) ABSTRACT

An image reading apparatus is provided which includes a cold-cathode tube for irradiating a linearly extending image reading section, and a plurality of light receiving elements for receiving light reflected at the image reading section. The cold-cathode tube is provided with a first end portion, a second end portion, and an intermediate portion arranged between the first end portion and the second end portion. At least one of the first and the second end portions extends in a direction differing from another direction in which the intermediate portion extends. The image reading apparatus is also provided with a suitable number of shield members for preventing relatively weak image signals supplied by the light reading elements from being adversely influenced by electrical noises.

16 Claims, 21 Drawing Sheets

IMAGE READING APPARATUS

BACKGROUND OF THE INVENTION

1. Field of the Invention

The present invention relates to an image reading apparatus incorporated in a facsimile machine, a scanner and the like.

2. Description of the Related Art

As is well known, a conventional image reading apparatus includes a light source for irradiating a document brought to an image reading section, and a plurality of light receiving elements mounted on a printed circuit board. The light receiving elements are arranged to receive light reflected at the image reading section and output image signals (which are relatively weak) in accordance with the received light. These image signals are sent to a predetermined position via a wiring pattern formed on the printed circuit board. The light source and the printed circuit board are accommodated in a suitable container.

The conventional image reading apparatus have been found disadvantageous in the following points.

It is assumed that a cold-cathode tube is used for the light source of the image reading apparatus. For actuating the cold-cathode tube, high-voltage and high-frequency driving power needs to be supplied to the cold-cathode tube. To this end, typically, use is made of an inverter connected to the cold-cathode tube via a connection cable.

In the above arrangement, due to the use of the high-voltage and high-frequency driving power, electrical noises may be generated at the inverter or the connection cable or the cold-cathode tube. The occurrence of electrical noises is unfavorable since the electrical noises tend to adversely influence the relatively weak image signals supplied by the light receiving elements.

The above problem may seem to be solved by using a light-emitting diode (which does not need high-voltage and high-frequency driving power) for the light source instead of the cold-cathode tube. However, when the image reading apparatus is incorporated in e.g. a facsimile machine, electrical noises may well be generated at some of the components or elements contained in the facsimile machine.

Turning back to an instance where a cold-cathode tube is used for the light source, the conventional image reading apparatus also suffers from the following problem.

As shown in FIG. 22 of the accompanying drawings, a conventional cold-cathode tube has an elongated, straight configuration. Specifically, the conventional cold-cathode tube has two longitudinal ends 39 and an intermediate portion 3e located between the ends 39. As illustrated, the cold-cathode tube has a length which is generally equal to the width L1 of a document 90 to be read out. Such an arrangement has the following disadvantage.

Reference is now made to FIG. 23 which shows the relationship between relative luminosity of the conventional cold-cathode tube and longitudinal positions of the cold-cathode tube. As can be seen, the relative luminosity at the ends 39 of the cold-cathode tube (indicated by reference character C) is unduly smaller by about 20–30% than that in the intermediate portion 3e. Thus, when the length of the cold-cathode tube is equal to the width L1 of the document (FIG. 22), the cold-cathode tube will fail to properly irradiate the end portions of the document corresponding in position to the ends 39 of the cold-cathode tube.

In order to overcome the above problem, an arrangement shown in FIG. 24 may be adopted. According to the illustrated arrangement, the length L2 of the cold-cathode tube is rendered greater than the width L1 of the document 90. In this manner, every portion of the document 90 can be irradiated with an equal amount of light emitted from the intermediate portion of the cold-cathode tube.

However, with the arrangement shown in FIG. 24, the ends 38 of the cold-cathode tube are located outside of the document 90 as viewed in the primary scanning direction. Clearly, this arrangement is disadvantageous since the size of the image reading apparatus is unfavorably made larger due to the increased length of the cold-cathode tube.

Further, a certain amount of light is emitted from the ends 38 of the cold-cathode tube. However, in the arrangement shown in FIG. 24, the light from the ends 38 will simply be wasted without being used to irradiate the document 90.

SUMMARY OF THE INVENTION

It is, therefore, an object of the present invention is to provide an image reading apparatus which eliminates or reduces the above-described problems.

According to a first aspect of the present invention, there is provided an image reading apparatus comprising:

a cold-cathode tube for irradiating a linearly extending image reading section, the cold-cathode tube including a first end portion, a second end portion, and an intermediate portion arranged between the first end portion and the second end portion; and a plurality of light receiving elements for receiving light reflected at the image reading section;

wherein at least one of the first and the second end portions extends in a direction differing from another direction in which the intermediate portion extends.

With such an arrangement, a document to be read out is advantageously irradiated since the first or second end portion extends from the intermediate portion at a certain angle (90 degrees for example). Further, with the above arrangement, the longitudinal dimension of the cold-cathode tube can be reduced. Thus, the image reading apparatus incorporating the cold-cathode tube can be reduced in size.

According to a preferred embodiment, each of the first and the second end portions extends in a direction differing from said another direction.

The image reading apparatus further comprises a lens array for focusing the reflected light onto the light receiving elements, wherein the lens array is disposed in a region defined by the first end portion, the second end portion and the intermediate portion.

With such an arrangement, the lens array and the cold-cathode tube are compactly held in place.

The image reading apparatus may further comprise an inverter for supplying power to the cold-cathode tube, wherein the lens array is disposed between the inverter and the intermediate portion.

According to a second aspect of the present invention, there is provided a cold-cathode tube for irradiating an image reading section of an image reading apparatus comprising:

a first end portion provided with an electrode;

a second end portion provided with another electrode; and an intermediate portion arranged between the first end portion and the second end portion;

wherein at least one of the first and the second end portions extends in a direction differing from another direction in which the intermediate portion extends.

According to a third aspect of the present invention, there is provided an image reading apparatus comprising:

a light source for irradiating an image reading section;

a plurality of light receiving elements for receiving light reflected at the image reading section;

a printed circuit board having an upper surface for mounting the light receiving elements and a lower surface opposite to the upper surface;

a container for accommodating the light source and the printed circuit board;

an outer shield member which is grounded and externally attached to the container; and an inner shield member which is accommodated in the container and electrically connected to the outer shield member.

With such an arrangement, electrical noises can be shielded by the outer and the inner shield members, so that the relatively weak image signals supplied from the light receiving elements will not be adversely influenced by the noises.

The light source may comprise a cold-cathode tube, the inner shield member being arranged between the cold-cathode tube and the printed circuit board.

According to a preferred embodiment, the image reading apparatus further comprises a reflector for supporting the cold-cathode tube, wherein the inner shield member defines a groove for accommodating the reflector.

The container may be formed with a first hollow portion for accommodating the inner shield member.

The image reading apparatus may further comprise a light-guiding member for leading light from the light source to the image reading section, and a reflector for supporting the light-guiding member.

The light source may comprise a light-emitting diode mounted on the upper surface of the printed circuit board.

The light-guiding member may include a plurality of side surfaces arranged to totally reflect light propagating through the light-guiding member.

The light-guiding member may also include a light-emitting surface for allowing the propagating light to leave the light-guiding member.

Preferably, the outer shield member is arranged to cover the lower surface of the printed circuit board.

The outer shield member may have an upwardly open, box-like configuration.

The container may be formed with a second hollow portion for accommodating the printed circuit board, the outer shield member being arranged to come into contact with the lower surface of the printed circuit board so that the printed circuit board is kept within the second hollow portion.

The printed circuit board may be provided with an electrode for grounding, the inner shield member being electrically connected to the electrode for grounding, the outer shield member being electrically connected to the inner shield member.

The inner shield member may be formed with a first terminal projecting from the inner shield member, the first terminal being elastically pressed against the electrode for grounding.

The outer shield member may be formed with a second terminal projecting from the outer shield member, the second terminal being elastically pressed against the inner shield member.

The inner shield member may be provided with an auxiliary portion extending externally of the container, the auxiliary portion being held in contact with the outer shield member.

Other objects, features and advantages of the present invention will become clearer from the detailed description of preferred embodiments given below with reference to the accompanying drawings.

DETAILED DESCRIPTION OF THE PREFERRED EMBODIMENTS

The preferred embodiments of the present invention will be described below with reference to the accompanying drawings.

Reference is first made to FIGS. 1–5 which illustrate an image reading apparatus according to a first embodiment of the present invention.

Figure 1:
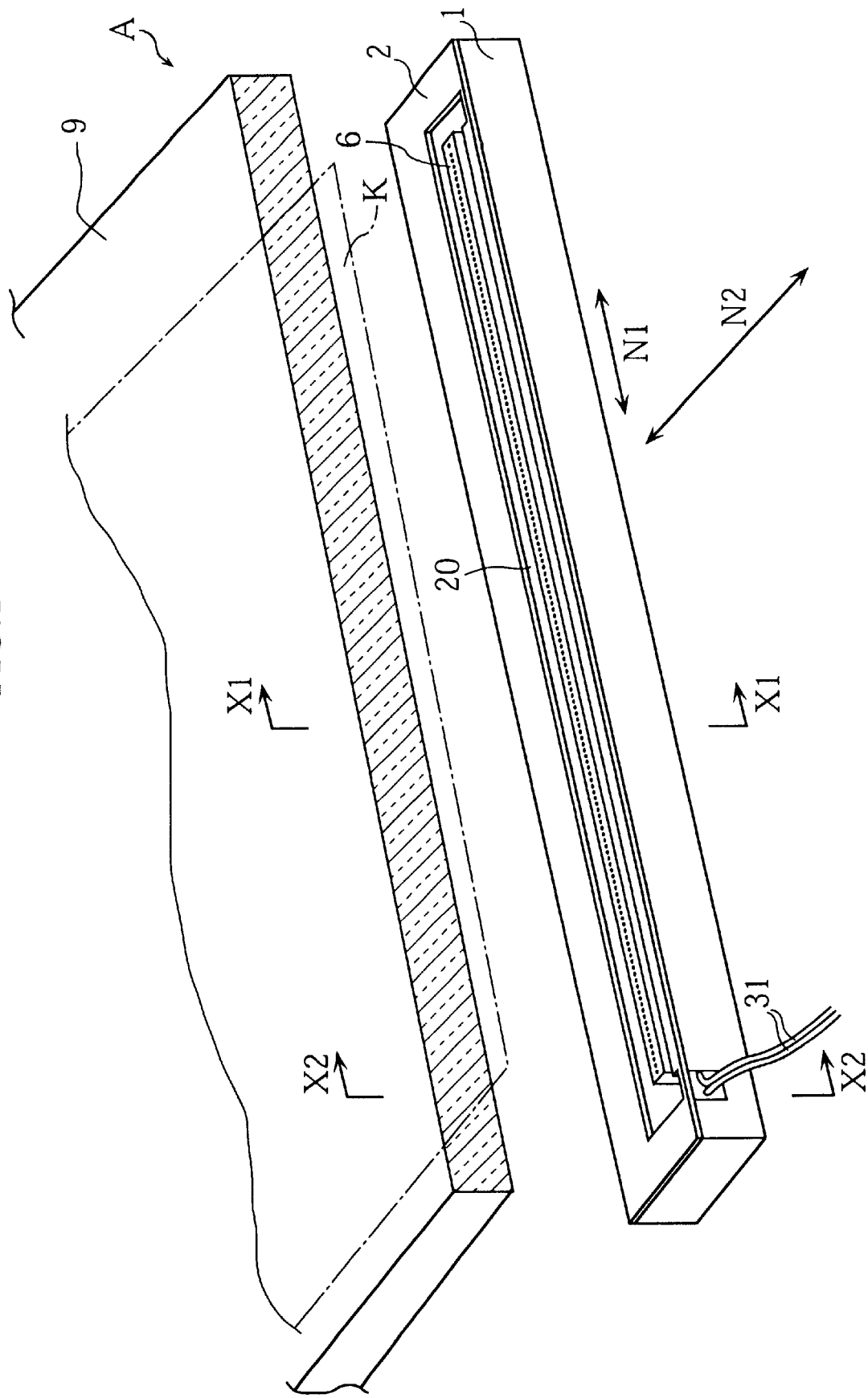
FIG. 1 is a schematic view showing an image reading apparatus according to a first embodiment of the present invention.

As shown in FIG. 1, the image reading apparatus A of the first embodiment includes a transparent glass plate 9 on which a document K to be read is placed, and a box-like container 1 arranged under the glass plate 9. The container 1, which may be made of a synthetic resin material, has a predetermined length as viewed in the primary scanning direction N1. The container 1 accommodates various elements or components, as will be described below. The container 1 is arranged to be moved in the secondary scanning direction N2 by a conventionally known mechanism (including a driving motor and a suitable belt which is associated with the driving motor and connected to the container 1).

Figure 2:
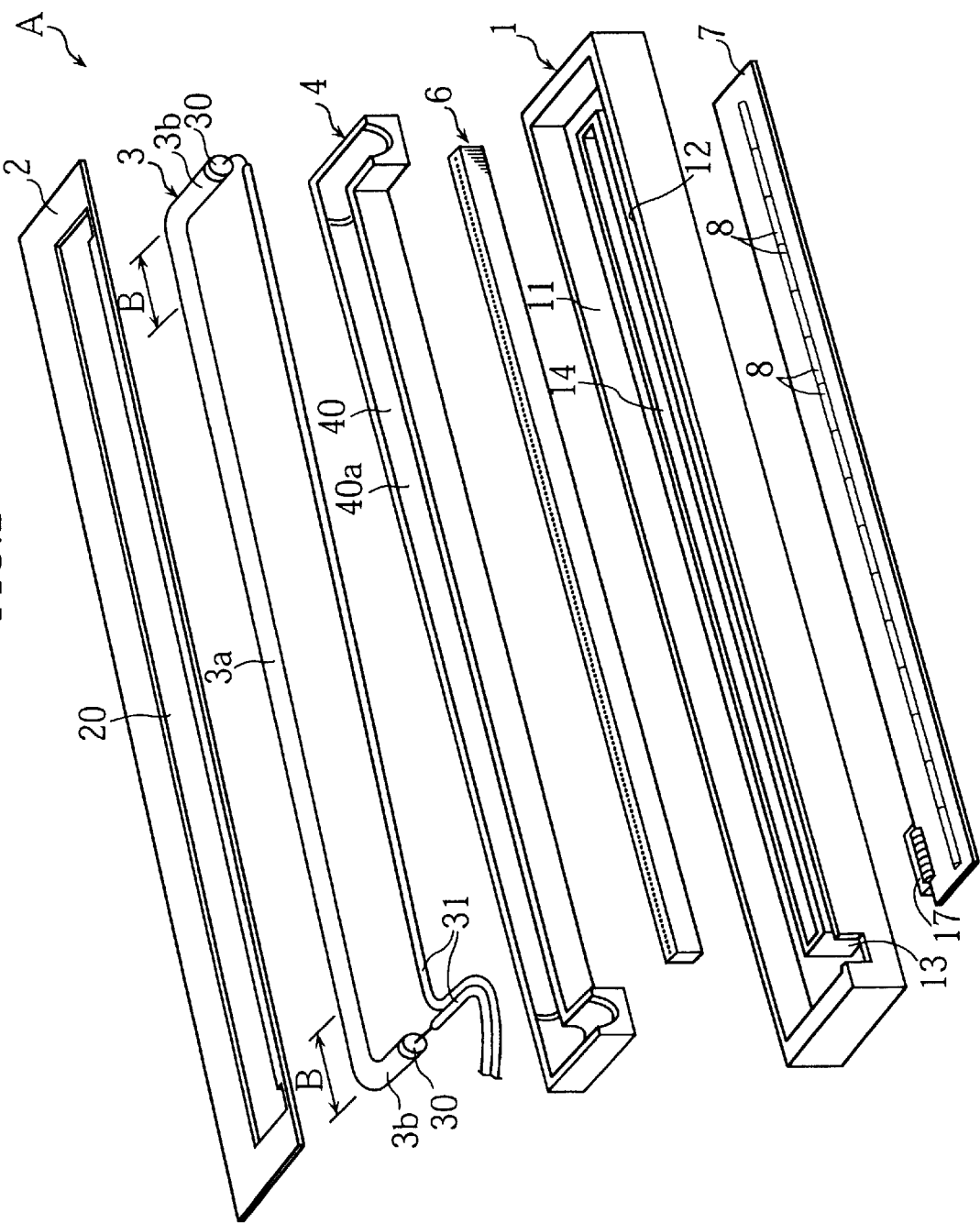
FIG. 2 is an explosive view illustrating components used for the image reading apparatus of FIG. 1.

As shown in FIG. 2, the container 1 holds a cover member 2, a cold-cathode tube 3, a reflector 4, a lens array 6 and a printed circuit board 7 which carries a plurality of light receiving elements 8.

The cold-cathode tube 3 is provided for irradiating an image reading section P (see FIG. 3) which extends linearly on the glass plate 9. As shown in FIG. 2, the cold-cathode tube 3 includes an intermediate straight portion 3a and two end portions 3b. Each of the end portions 3b extends from the intermediate portion 3a at the right angle (i.e., 90 degrees). Two electrodes 30 are attached to the respective end portions 3b. In operation, driving power (which may be 600V, 30–160 kHz, 3–5 mA) is supplied to the electrodes 30 via a connection cable 31. As a result, white light will be emitted from substantially every portion of the cold-cathode tube 3.

The reflector 4 serves to support the cold-cathode tube 3. As can be seen from FIG. 2, the reflector 4 is provided with an upwardly open groove 40 for accommodating the cold-cathode tube 3. In an assembled state, the reflector 4 is held in direct contact with the cold-cathode tube 3 only at a few locations, so that most of the surface area of the cold-cathode tube 3 is spaced from the inner surface 40a of the groove 40 (see FIG. 3 for example). In this manner, it is possible to prevent the heat generated at the cold-cathode tube 3 from unduly transmitted to the reflector 4. Such an arrangement is advantageous because if otherwise (i.e., if a large part of the surface area of the cathode tube 3 is held in direct contact with the reflector 4), the temperature of the cold cathode tube 3 in operation will unfavorably decrease, which results in reducing luminous energy obtained from the cold-cathode tube 3.

The inner surface 40a of the groove 40 is rendered white for providing excellent light reflection. Thus, the light emitted from the cold-cathode tube 3 is properly reflected on the inner surface 40a to be directed to the image reading section P. In order to obtain a white inner surface 40a, use may be made of a white synthetic resin for making the reflector 4. Alternatively, it is also possible to paint the inner surface 40a white, or to cover the inner surface 40a with a white sheet.

Figure 3:
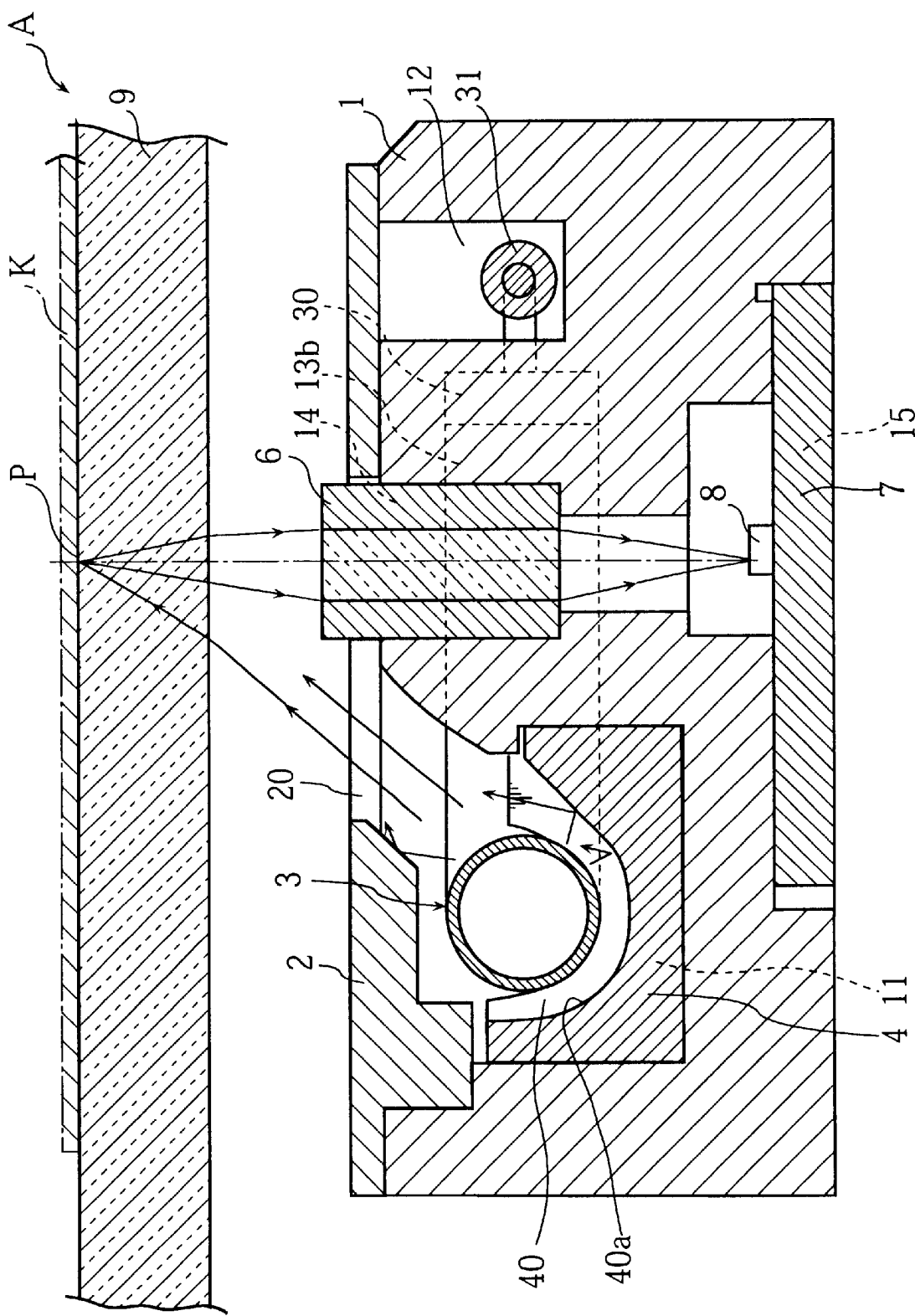
FIG. 3 is a sectional view taken along lines X1—X1 in FIG. 1.

As shown in FIG. 3, the reflector 4 with the cold-cathode tube 3 supported thereby is fitted into an upwardly open, first accommodating portion (hollow portion) 11 of the container 1 (see also FIG. 2). To this end, the first accommodating portion 11 is arranged to have a suitable configuration corresponding to that of the reflector 4.

Figure 4:
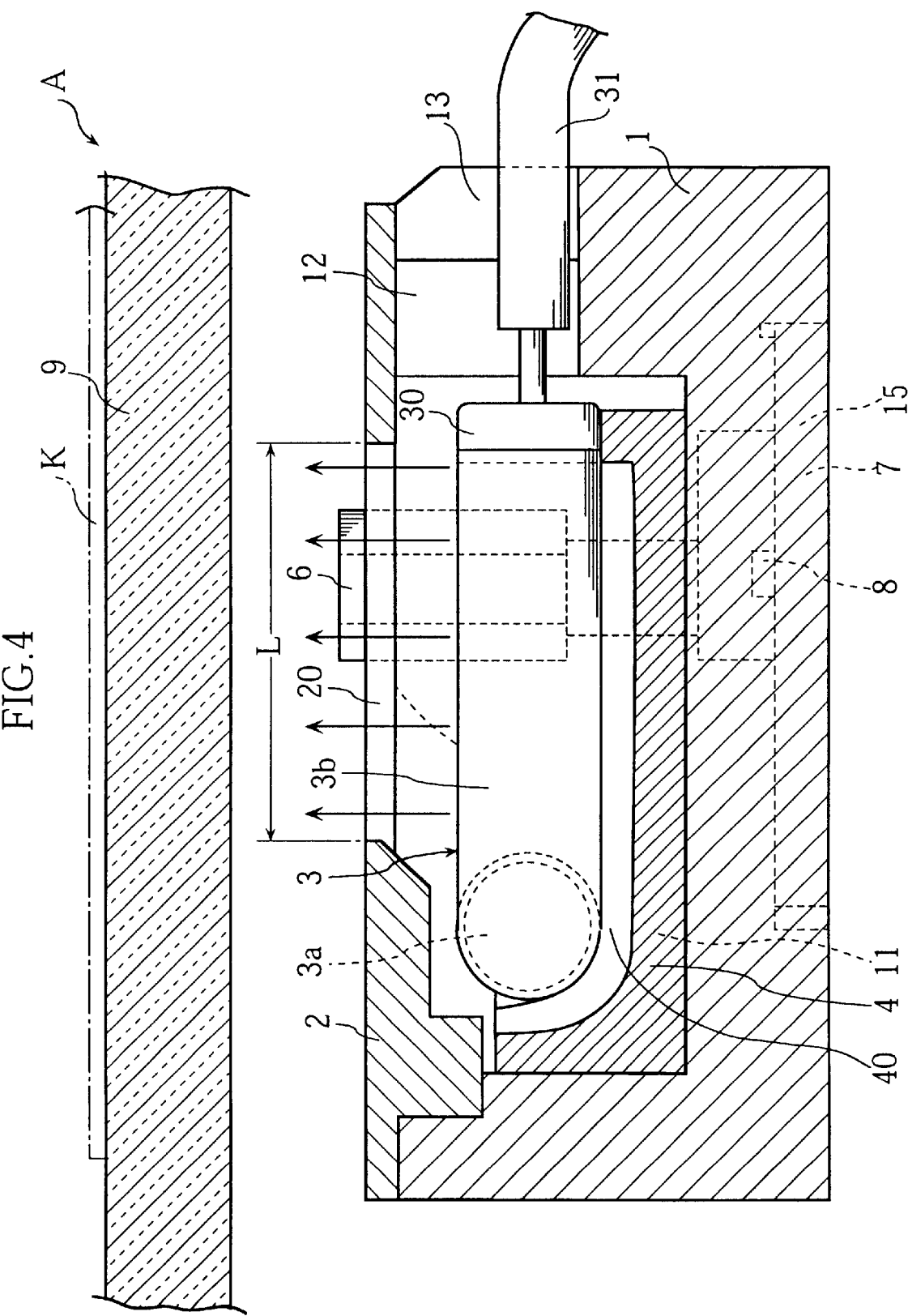
FIG. 4 is a sectional view taken along lines X2—X2 in FIG. 1.

As can be seen from FIGS. 2 and 3, a part of the connection cable 31 is placed in an upwardly open second accommodating portion 12 of the container 1. The other part of the connection cable 31, as can be seen from FIGS. 1 and 4, is led out of the container 1 via a cutout 13 communicating with the second accommodating portion 12. Though not illustrated, the connection cable 31 is connected at an outer end thereof to an inverter which is arranged outside of the container 1. The driving power for the cold-cathode tube 3 is supplied from the non-illustrated inverter.

Unfavorably, electrical noises may be generated at the cold-cathode tube 3 and/or the connection cable 31 due to the high-frequency current supplied from the inverter. The inverter itself may generate electrical noises. Thus, preferably, use is made of a grounded shield member (not shown) arranged at a position between the cold-cathode tube 3 and the light receiving elements 8 as well as at a position between the connection cable 31 and the light receiving elements 8. In this manner, image signals supplied from the light receiving elements 8 can be prevented from being adversely affected by the electrical noises.

The cover member 2, which may be made of a synthetic resin material, has an elongated rectangular configuration and is formed with an opening or cutout 20, as shown in FIGS. 1 and 2. The cover member 2 is attached to the container 1 from above for covering the cold-cathode tube 3 and the inner part of the connection cable 31. The fixing of the cover member 2 to the container 1 may be realized by bringing projections formed on the cover member 2 into engagement with bores formed in the container 1.

As illustrated in FIG. 3, the opening 20 of the cover member 2 prevents the lens array 6 from interfering with the cover member 2. The opening 20 also serves to allow the passage of the light emitted from the cold-cathode tube 3, so that the image reading section P is properly irradiated by the light. As best shown in FIG. 4 (see also FIG. 2), the longitudinal ends of the opening 20 (which correspond in position to the end portions 3b of the cold-cathode tube 3) have a width L which is greater than that of the other part of the opening 20. Thus, the light emitted from the end portions 3b can be used to irradiate the document K placed on the glass plate 9.

Normally the entirety of the cover member 2 is made black. However, when an increased amount of light is needed for irradiation of the image reading section P (as in a case where a rod lens having a relatively great depth of focus is used for the lens array 6), the lower surface of the cover member 2 which faces to the cold-cathode tube 3 may be rendered white. With such an arrangement, the light which would otherwise be absorbed by the lower surface of the cover member 2 may advantageously be reflected toward the image reading section P.

The lens array 6 is provided for focusing the light reflected on the document K onto the light receiving elements 8. The lens array 6 may be made up of a plurality of rod lenses arranged in the primary scanning direction. These rod lenses may be held together by a holder made of a synthetic resin material. Alternatively, use may be made of a plurality of convex lenses for the lens array 6.

Figure 5:
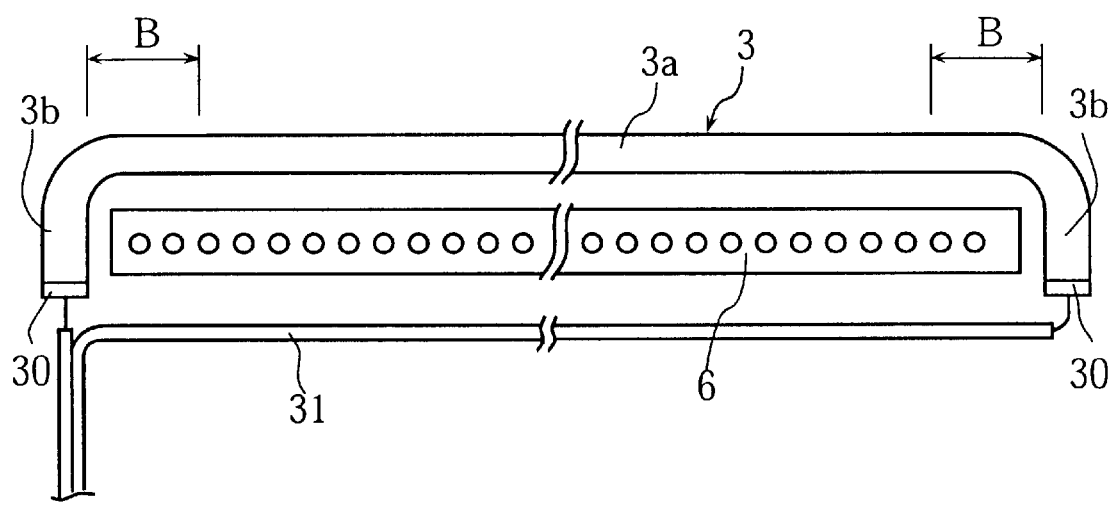
FIG. 5 is a plan view showing an arrangement of a lens array surrounded by a cold-cathode tube and a connection cable.

The lens array 6 is fitted into an upwardly open third accommodating portion 14 of the container 1. As illustrated in FIG. 3, the third accommodating portion 14 is located between the first accommodating portion 11 and the second accommodating portion 12. Thus, as best shown in FIG. 5, the lens array 6 is surrounded by the cold-cathode tube 3 (the intermediate portion 3a and the end portions 3b) and the connection cable 31.

With such an arrangement, the space surrounded by the cold-cathode tube 3 and the connection cable 31 is not wasted but advantageously used for installation of the lens array 6. Further, with the above arrangement, the entirety of the intermediate portion 3a of the cold-cathode tube 3 is arranged to face the linearly extending image reading section P, while the end portions 3b of the cold-cathode tube 3 are positioned close to the respective longitudinal ends of the image reading section P.

Upon receiving the light from the lens array 6, the light receiving elements 8 will output image signals whose voltages correspond to the received light. As best shown in FIG. 2, the light receiving elements 8 are arranged in a row extending longitudinally of the printed circuit board 7. Each of the light receiving elements 8 is capable of reading out color images. For performing the color image reading, the light receiving element 8 is provided with three light-receiving portions which are covered with a red filter, a green filter and a blue filter, respectively.

As shown in FIG. 2, the printed circuit board 7 has an elongated, rectangular parallelepiped configuration. The printed circuit board 7 may be made of a ceramic material or a resin material such as epoxy. One of the longitudinal ends of the printed circuit board 7 is used for supporting a connector 17. Though not illustrated, a predetermined wiring pattern connected to the connector 17 is formed on the printed circuit board 7. Various kinds of signals are supplied to and/or sent out from the light receiving elements 8 via the wiring pattern and the connector 17.

As shown in FIG. 3, the printed circuit board 7 is attached to the container 1 from below. For avoiding unfavorable bulging of the printed circuit board 7, the container 1 is provided with a downwardly open, fourth accommodating portion 15 into which the printed circuit board 7 is fitted. In an assembled state, the light receiving elements 8 on the printed circuit board 7 are located below the lens array 6. The printed circuit board 7 is fixed to the container 1 by a suitable adhesive or an attachment for example.

Description will now be given to the function of the image reading apparatus A described above.

When the image reading apparatus A is turned on, the cold-cathode tube 3 is energized to emit white light from substantially all portions of the cold-cathode tube 3. However, the luminous energy of the light obtained from the cold-cathode tube 3 will vary depending on locations of the cold-cathode tube 3. Specifically, the luminous energy emitted from the end portions 3b tends to be lower than the luminous energy emitted from the intermediate portion 3a. On the other hand, the luminous energy obtained from the intermediate portion 3a is substantially constant at any point of the intermediate portion 3a. As previously stated, the intermediate portion 3a is arranged to face the image reading section P. Thus, every part of the linearly extending image reading section P can be irradiated by the cold-cathode tube 3 with substantially the same amount of luminous energy.

To be absolutely accurate, the luminous energy obtained from the intermediate portion 3a may also vary depending on locations. For instance, when the end portions 3b of the cold-cathode tube 3 are rather short, the luminous energy obtained from the end regions B (see FIGS. 2 and 5) of the intermediate portion 3a will be lower than the luminous energy obtained from the other region of the intermediate portion 3a. Thus, without taking any countermeasures, the longitudinal ends of the image reading section P would fail to be properly irradiated with light.

According to the first embodiment of the present invention, the end portions 3b are arranged to extend from the intermediate portion 3a at the right angle, and these end portions 3b also emit light for irradiating the longitudinal ends of the image reading section P. With such an arrangement, the longitudinal ends of the image reading section P can properly be irradiated with light from the end regions B of the intermediate portion 3a and from the end portions 3b. In this manner, the image reading section P as a whole is equally irradiated, so that the image reading operation of the document K is properly performed.

The image reading apparatus A also has the following advantage. As can be seen from FIG. 2 for example, the overall length of the cold-cathode tube 3 is set to be greater than that of the image reading section P. However, in the first embodiment, the end portions 3b are bent to extend in the secondary scanning direction. Thus, even though a relatively long cold-cathode tube is used, the longitudinal size of the container 1 will not be unduly increased.

Figure 6:
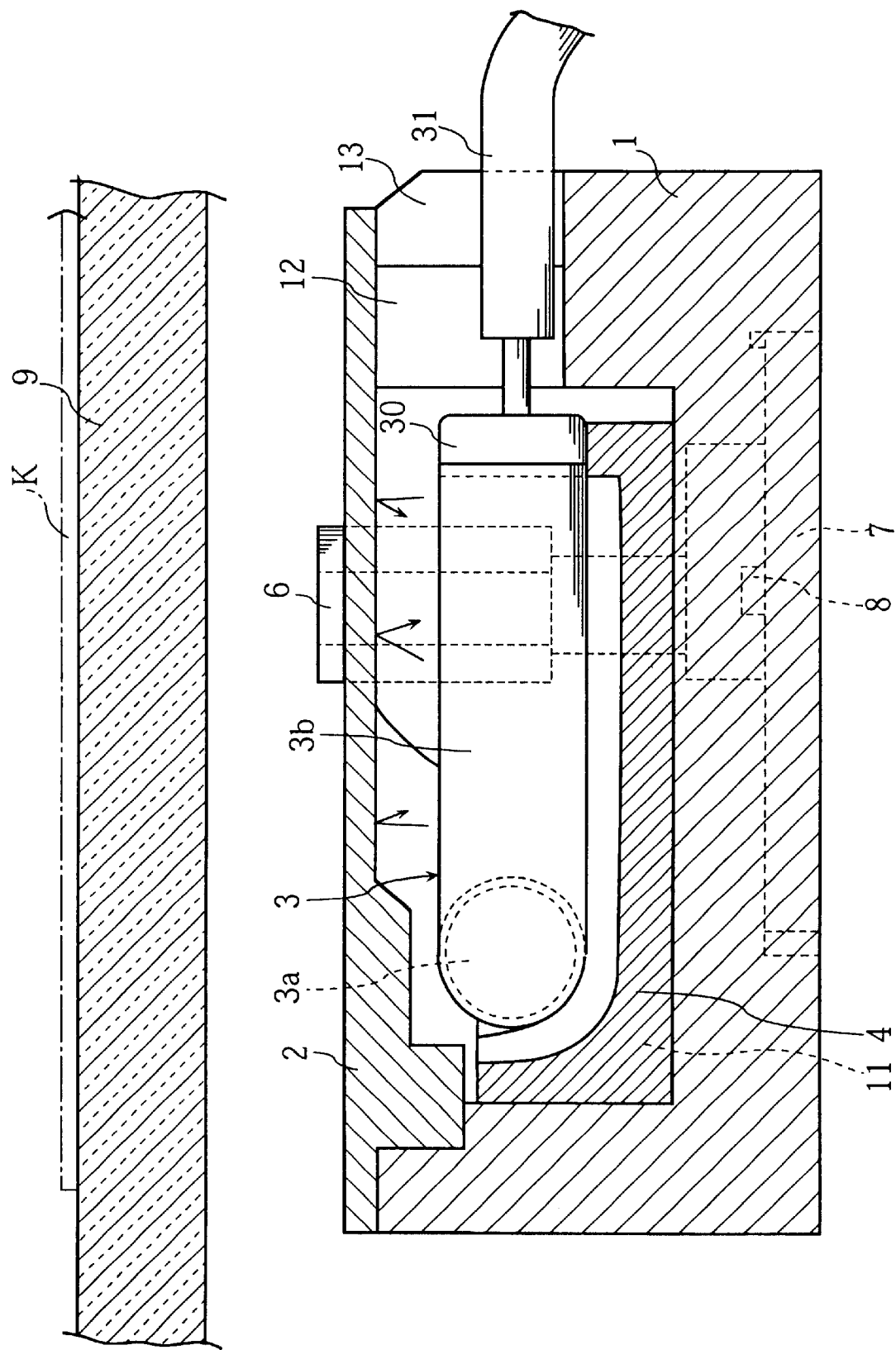
FIG. 6 is a sectional view illustrating a modified example of the image reading apparatus of FIG. 1.

In the first embodiment described above, the opening 20 of the cover member 2 is rendered wide enough so that the light emitted from the end portions 3b of the cold-cathode tube 3 is allowed to pass through the opening 20 for irradiating the document K. However, when the document K is properly irradiated only with the light from the intermediate portion 3a of the cold-cathode tube 3, the light from the end portions 3b may be shielded by the cover member 2, as shown in FIG. 6. The illustrated arrangement may need to be made when the length of the end portions 3b is increased to a certain extent. (It should be noted that every part of the intermediate portion 3a of the cold-cathode tube 3 will emit an equal amount of light as the length of the end portions 3b is increased.)

Figure 7:
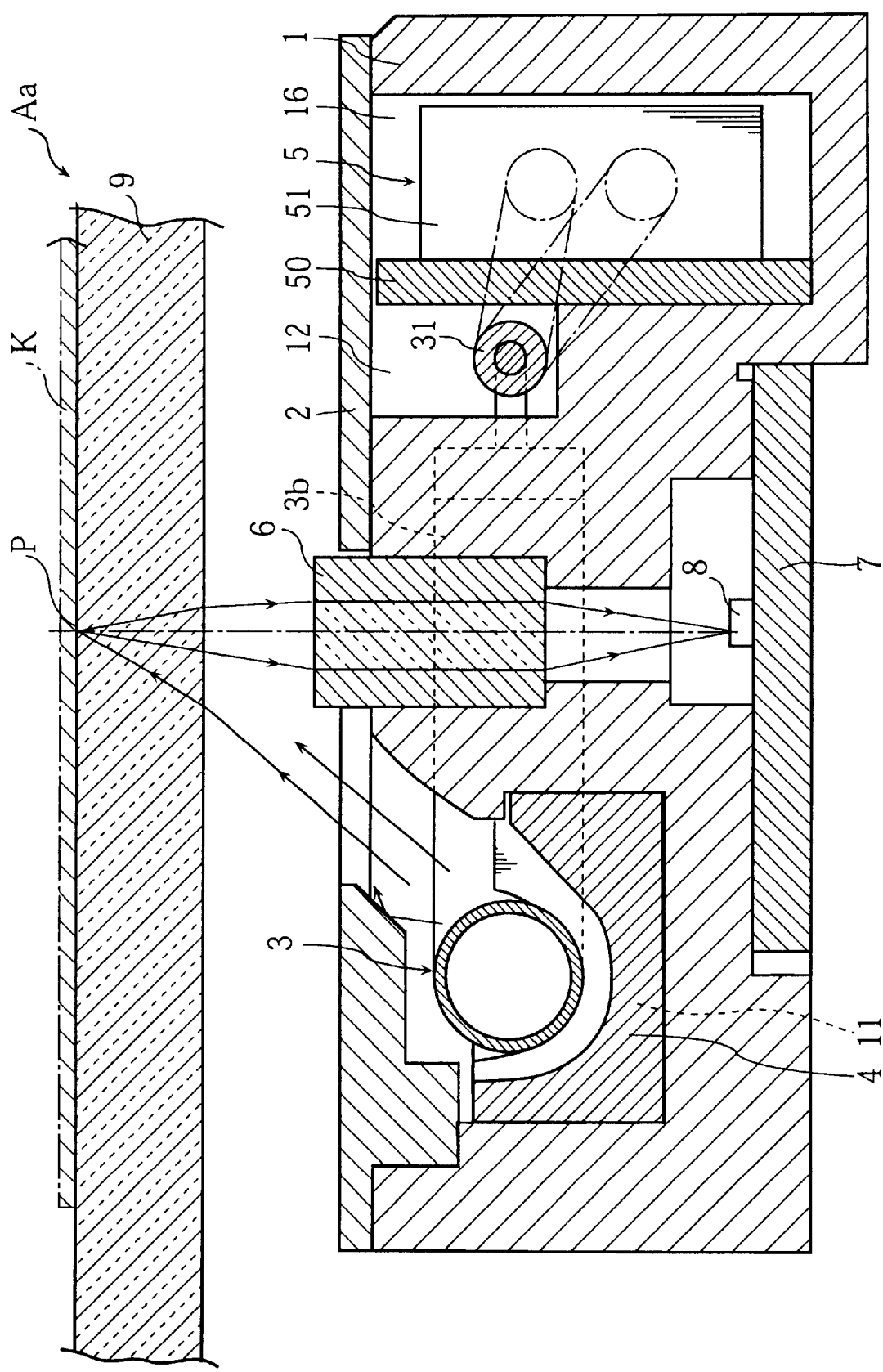
FIG. 7 is a sectional view showing an image reading apparatus according to a second embodiment of the present invention.
Figure 8:
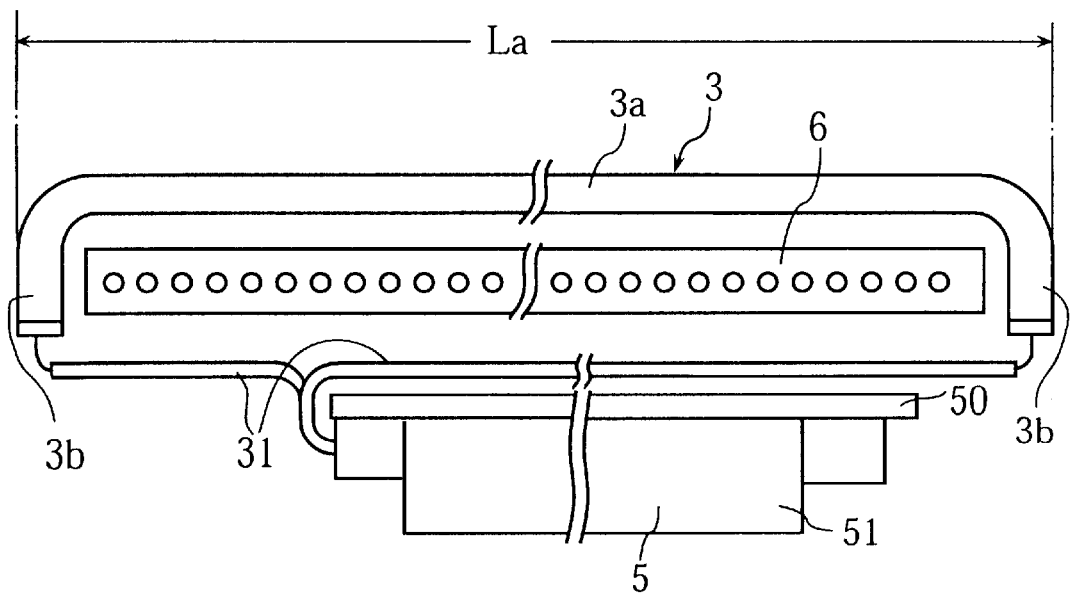
FIG. 8 is a plan view showing an arrangement of a lens array surrounded by a cold-cathode tube, a connection cable and an inverter.

Reference is now made to FIGS. 7 and 8 which illustrate an image reading apparatus Aa according to a second embodiment of the present invention. As can be seen from FIGS. 7 and 8, the image reading apparatus Aa of the second embodiment has arrangements which are identical or similar to those of the image reading apparatus A of the first embodiment. Hereinafter, no detailed description will be given to these arrangements common to the first and the second embodiments.

According to the second embodiment, an inverter 5 for supplying driving power to a cold-cathode tube 3 is incorporated in a container 1, as shown in FIG. 7. Specifically, the container 1 is formed with an upwardly open fifth accommodating portion 16 for installing the inverter 5. After the inverter 5 is properly fixed, a cover member 2 is attached to the container 1 from above so that the fifth accommodating portion 16 is closed by the cover member 2.

As shown in FIG. 7, the inverter 5 includes a printed circuit board 50 and a protection cover 51. Though not illustrated, a wiring pattern is formed on the printed circuit board 50 for connecting electrical components mounted on the printed circuit board 50 to each other. These electrical components are provided for performing DC/AC conversion, voltage transformation and the like. The protection cover 51 is fixed to the printed circuit board 50 to enclose the electrical components. Preferably, the protection cover 51 is arranged to shield noises generated by the electrical components.

The converter 5 is connected to the cold-cathode tube 3 via a connection cable 31. Thus, as viewed from above (see FIG. 8), a lens array 6 of the image reading apparatus Aa is surrounded by the cold-cathode tube 3 (provided with an intermediate portion 3a and end portions 3b), the connection cable 31 and the inverter 5.

According to the second embodiment, the inverter 5 is incorporated in the container 1. Such an arrangement is advantageous in installing the image reading apparatus Aa in e.g. a copier or a facsimile machine since there is no need to handle the inverter 5 separately from the container 1.

Figure 9:
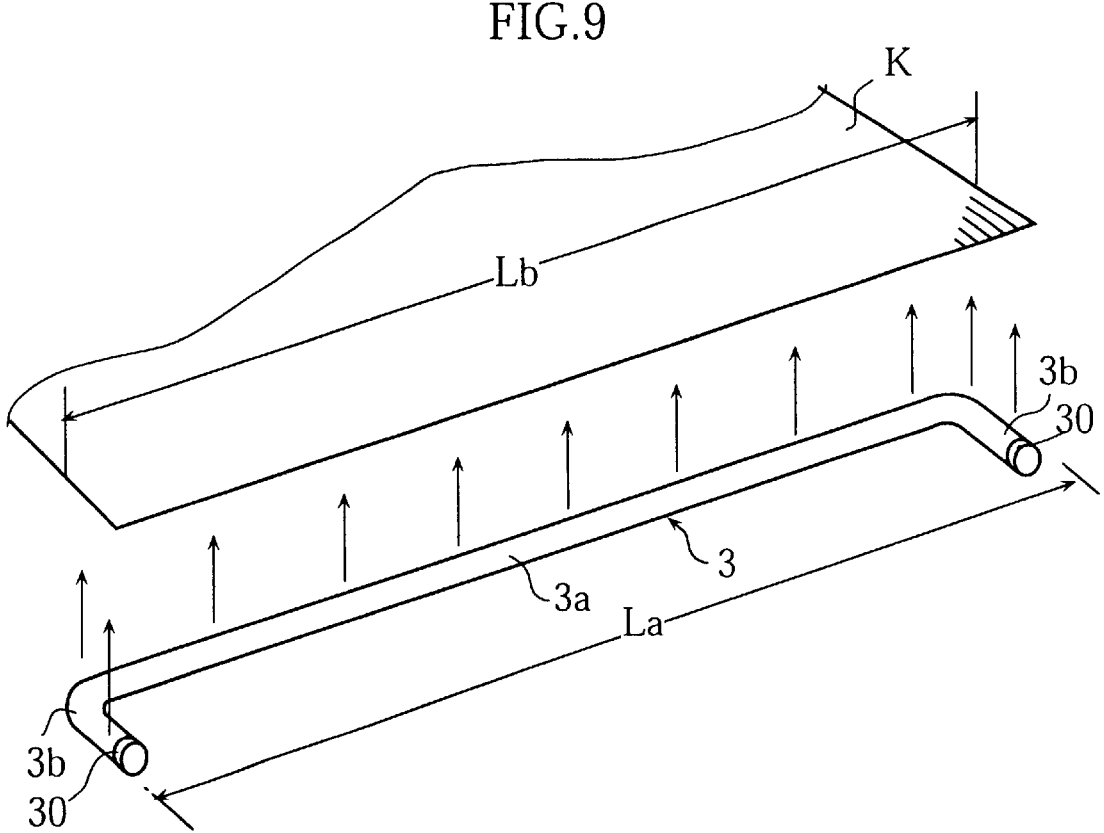
FIG. 9 illustrates a modified example of the image reading apparatus of the second embodiment.

In the first and the second embodiments described above, the elongated lens array 6 is located between the two end portions 3b (see FIG. 6 and FIG. 8). In other words, the longitudinal dimension La of the cold-cathode tube 3 is rendered greater than the length of the lens array 6. (It should be appreciated that the length of the lens array 6 is substantially equal to the maximum width of a document K to be read.) However, the present invention is not limited to the above arrangement. Specifically, referring to FIG. 9, the longitudinal dimension La of the cold-cathode tube 3 may be equal to the maximum width Lb of the document K. By adopting such a cold-cathode tube, an image reading apparatus can be reduced in size.

Reference is now made to FIGS. 10–14 which illustrate an image reading apparatus Ab according to a third embodiment of the present invention. In this embodiment again, no detailed description will be given to arrangements which are identical or similar to those of the first or the second embodiment.

Figure 10:
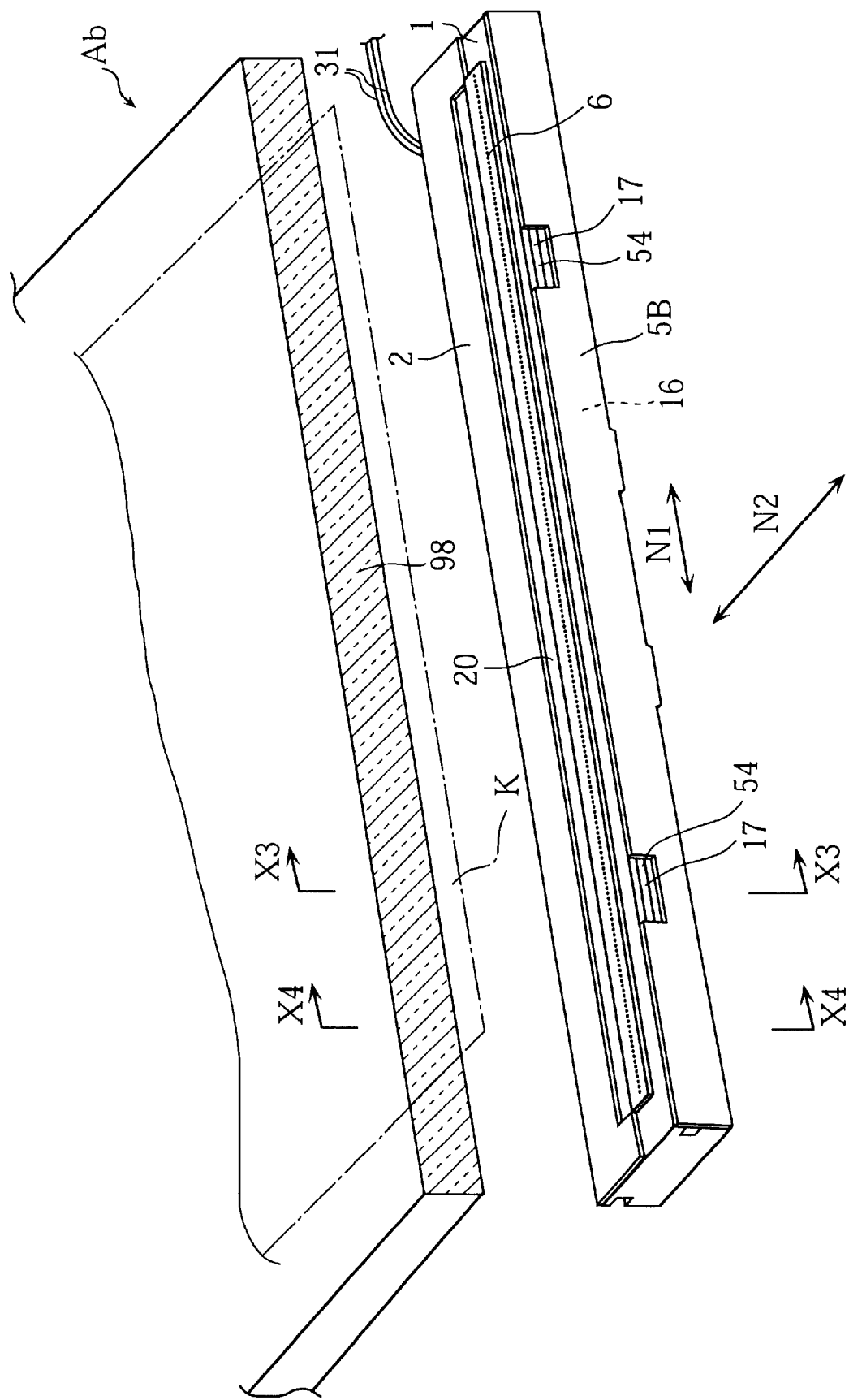
FIG. 10 is a schematic view showing an image reading apparatus according to a third embodiment of the present invention.

As shown in FIG. 10, the image reading apparatus Ab includes a transparent glass plate 98 and a container 1 which is elongated in the primary scanning direction N1. The container 1 is arranged under the glass plate 98 and movable in the secondary scanning direction N2. The container 1 supports a cover member 2 attached thereto.

Figure 11:
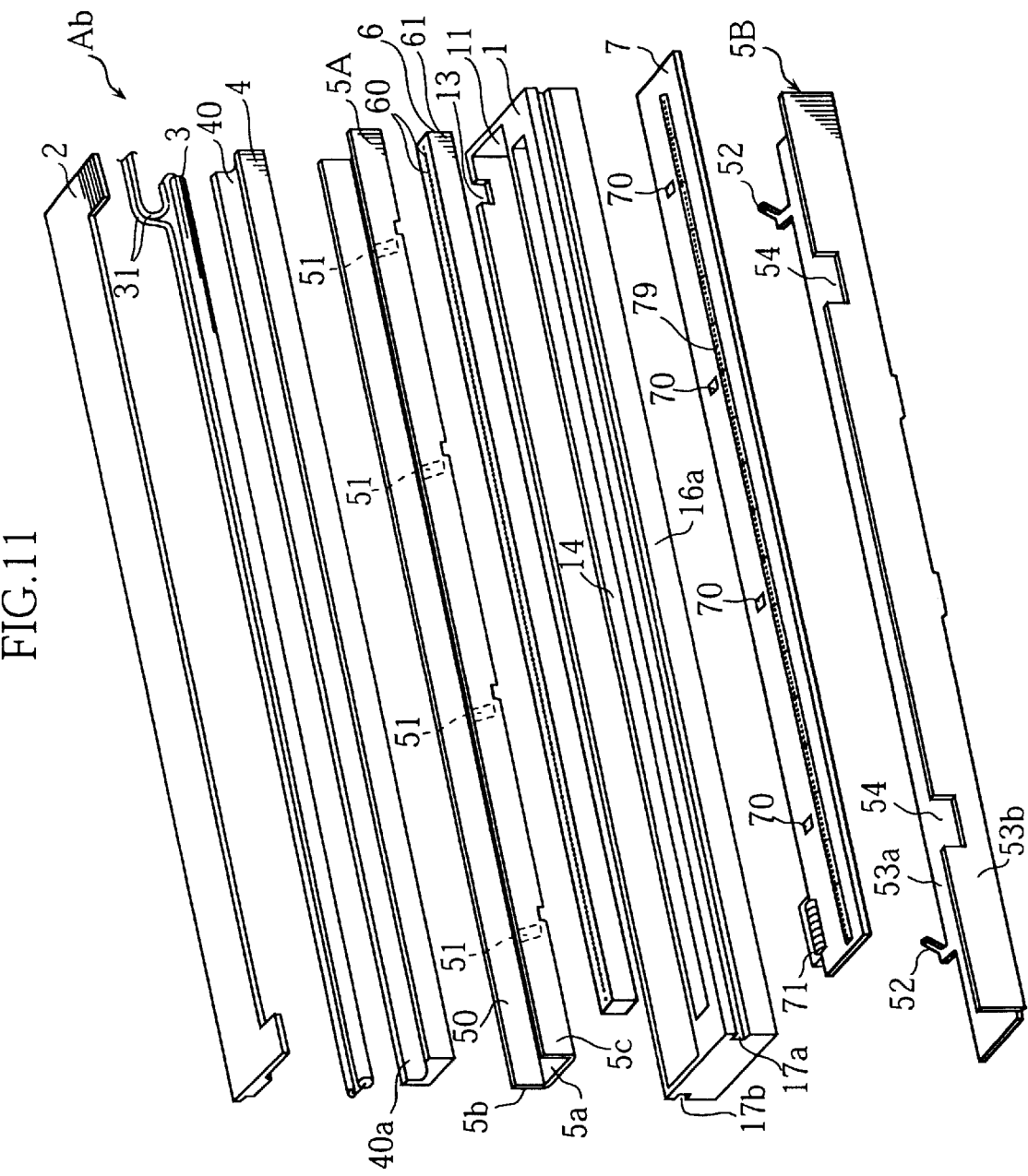
FIG. 11 is an explosive view showing components used for the image reading apparatus of the third embodiment.

Referring to FIG. 11, the container 1 accommodates a cold-cathode tube 3, a reflector 4, an inner shield member 5A and a lens array 6. A printed circuit board 7 and an outer shield member 5B are fixed to the container 1 from below. The printed circuit board 7 carries a plurality of light receiving elements 79 which are arranged in a row extending longitudinally of the printed circuit board 7.

Figure 12:
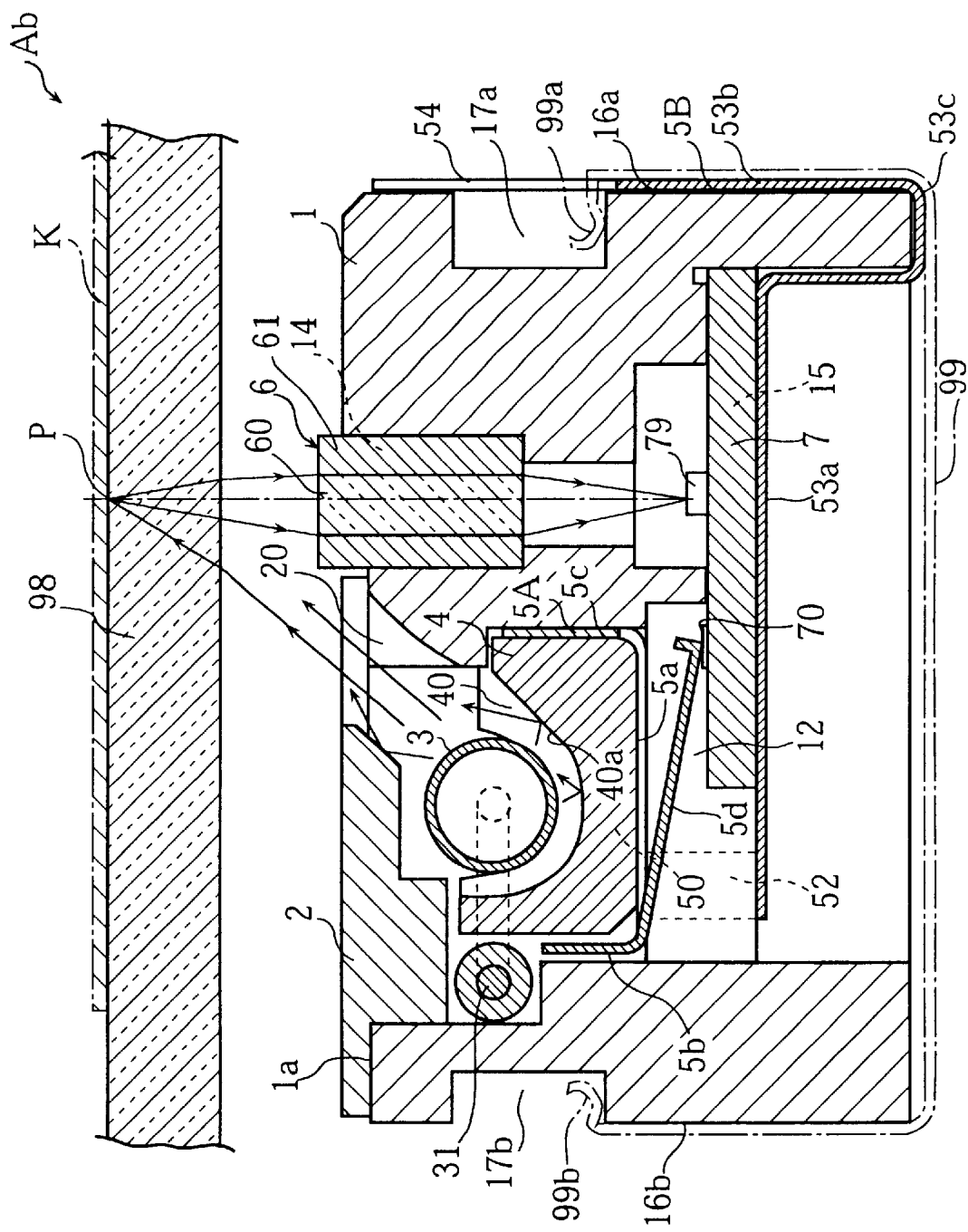
FIG. 12 is a sectional view taken along lines X3—X3 in FIG. 10.

The reflector 4 supports the cold-cathode tube 3 while also serving to lead the light generated by the cold-cathode tube 3 to an image reading section P (see FIG. 12). The reflector 4 is generally equal in length to the cold-cathode tube 3. The reflector 4 is formed with an upwardly open groove 40 in which the cold-cathode tube 3 is accommodated.

The cold-cathode tube 3 is supported only at its end portions by the reflector 4. At the other portions, the cold-cathode tube 3 is spaced from the inner surface 40a of the groove 40, as can be seen from FIGS. 12 and 13. The inner surface 40a of the groove 40 is white, so that most of the light emitted from the cold-cathode tube 3 is properly reflected on the inner surface 40a to be directed to the image reading section P.

The inner shield member 5A may be prepared by press-working a conductive, thin metal plate made of stainless steel for example. As shown in FIG. 11, the inner shield member 5A is generally equal in length to the reflector 4 and the cold-cathode tube 3. The inner shield member 5A is provided with a bottom portion 5a, a first upright portion 5b and a second upright portion 5c. The first and the second upright portions 5b, 5c extend from the bottom portion 5a at the right angle (see FIG. 13). Thus, an upwardly open groove 50 is defined. The reflector 4 is fitted into the groove 50, as illustrated in FIG. 14 for example.

As can be seen from FIG. 12, the bottom portion 5a is provided with a plurality of first terminals 5d protruding obliquely downward. Each of the first terminals 5d may be prepared by making suitable cuts in the bottom portion 5a and bending downwardly the portion defined by the cuts. The thus formed first terminal 5d is elastically deformable in the vertical direction.

Figure 14:
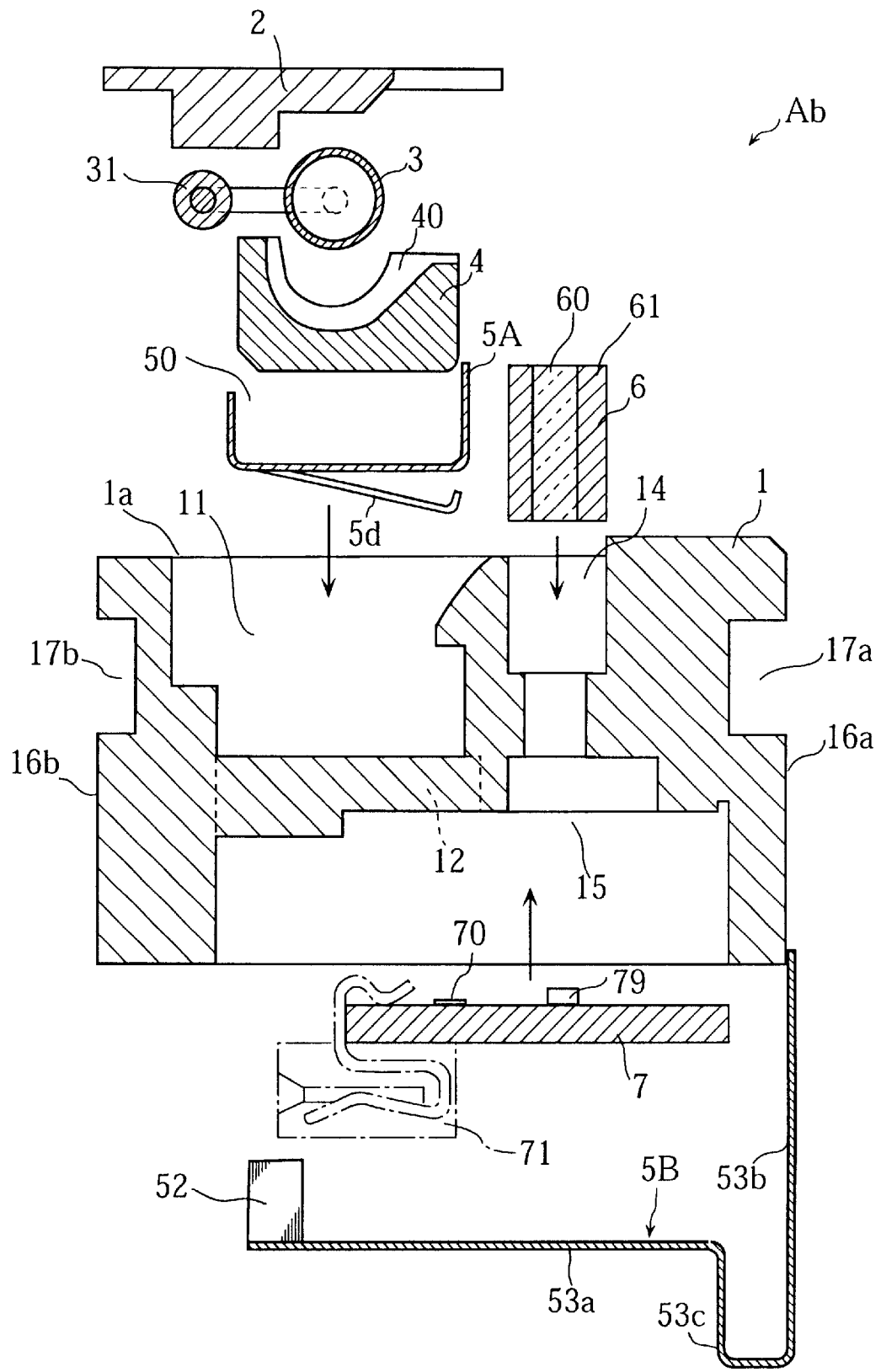
FIG. 14 is a sectional view illustrating how the components shown in FIG. 11 are assembled.

As shown in FIG. 14, the container 1 is formed with an upwardly open, first accommodating portion 11 into which the inner shield member 5A is placed. Below the accommodating portion 11, a plurality of bores 12 are provided for allowing the downward protrusion of the first terminals 5d.

After the inner shield member 5A is placed in the first accommodating portion 11, the reflector 4 and the cold-cathode tube 3 may be installed. Preferably, however, first the reflector 4 with the cold-cathode tube 3 mounted thereon is fitted into the groove 50 of the inner shield member 5A, and then the inner shield member 5A (together with the reflector 4 and the cold-cathode tube 3) is placed into the accommodating portion 11. In this manner, the installing of the three components 3, 4 and 5A into the container 1 can be performed collectively.

In order to transmit power to the cold-cathode tube 3, use is made of a connection cable 31 connected to the cold-cathode tube 3 (see FIG. 11). In an assembled state, a part of the connection cable 31 is arranged to extend along the reflector 4, as can be seen from FIGS. 11 and 12. The connection cable 31 is led out of the container 1 via a cutout 13 formed in the container 1 (see FIG. 11).

Figure 13:
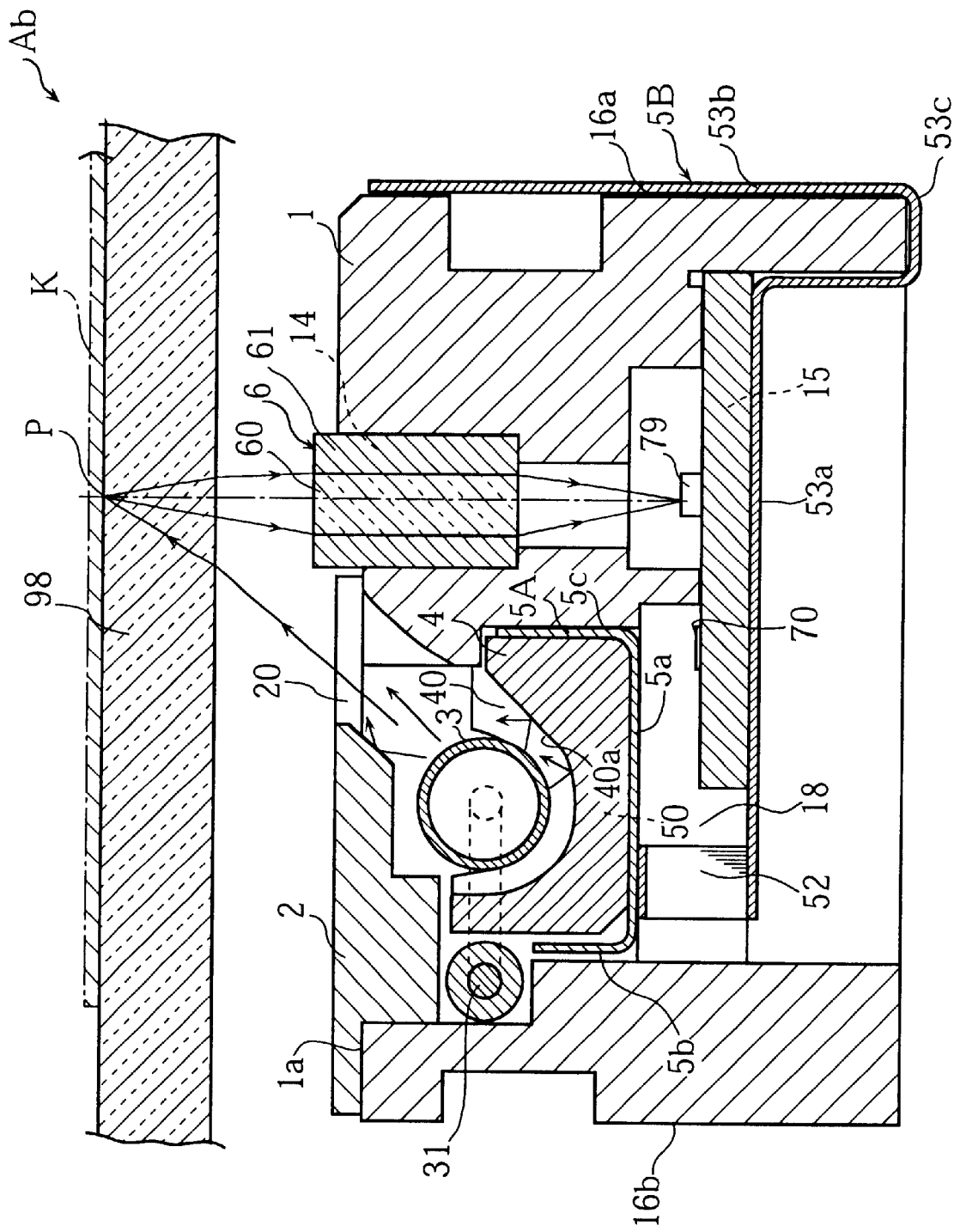
FIG. 13 is a sectional view taken along lines X4—X4 in FIG. 10.

The cover member 2 may be made of a synthetic resin material. As shown in FIGS. 12 and 13, when attached to an upper portion 1a of the container 1, the cover member 2 provides an opening 20 for allowing the passage of the light from the cold-cathode tube 3. In its fixed state, the cover member 2 is held above the cold-cathode tube 3 and the connection cable 31, so that these two components are protected from possible damage. Normally the entirety of the cover member 2 is rendered black. Alternatively, at least a lower part of the cover member 2 (that faces the cold-cathode tube 3) may be made white for irradiating the image reading section P with an increased amount of light.

The lens array 6 is provided for focusing reflected light from the image reading section P onto the light receiving elements 79. The lens array 6 includes a row of rod lenses 60 and a synthetic resin holder 61 for supporting the rod lenses 60. The lens array 6 is fitted into an upwardly open, second accommodating portion 14 of the container 1 in a manner such that the row of the rod lenses 60 extends in the first scanning direction.

As shown in FIG. 11, the printed circuit board 7 is an elongated plate which may be made of a ceramic material or an epoxy resin material. The printed circuit board 7 has a longitudinal end carrying a connector 71 used for electrically connecting the printed circuit board 71 to an external device (not shown). Though not illustrated, the upper surface of the printed circuit board 7 is provided with a wiring pattern for electrically connecting the connector 71 to the light receiving elements 79.

The upper surface of the printed circuit board 7 is also provided with an amplifying circuit (not shown) arranged adjacent to the connector 71. The amplifying circuit amplifies relatively weak image signals output from the light receiving elements 79. Then, the amplified image signals are sent to the above-mentioned external device via the connector 71. In such an arrangement, it is necessary to prevent the relatively weak image signals supplied by the light receiving elements 79 from being adversely affected by electrical noise.

The upper surface of the printed circuit board 7 is further provided with a plurality of electrode pads 70 used for grounding. As shown in FIG. 11, the pads 70 are spaced from each other at predetermined intervals longitudinally of the printed circuit board 7. Each of the electrode pads 70 has a flat, rectangular configuration and is connected to the wiring pattern formed on the printed circuit board 7. Instead of the flat pads 70, use may be made of a plurality of protrusions projecting upwardly from the upper surface of the printed circuit board 7.

As can be seen from FIGS. 12–14, the printed circuit board 7 is fitted into a downwardly open, third accommodating portion 15 of the container 1. In an assembled state, the light receiving elements 79 are located below the lens array 6.

When the printed circuit board 7 is fixed to the container 1, each of the first terminals 5d of the inner shield member 5A comes into contact with a corresponding one of the electrode pads 70. Since the first terminals 5d is pressed against the corresponding electrode pad 70 with a suitable elastic force, proper electrical connection is established between the first terminal 5d and the electrode pad 70. The bottom portion 5a (except for the first terminals 5d) and the second upright portion 5c of the inner shield member 5A are located between the cold-cathode tube 3 and the printed circuit board 7.

Similarly to the inner shield member 5A, the outer shield member 5B may be prepared by pressworking a conductive, thin metal plate made of stainless steel for example. As can be seen from FIG. 14 for example, the outer shield member 5B includes a horizontal portion 53a, an upright portion 53b and a U-shaped intermediate portion 53c connecting the horizontal portion 53a to the upright portion 53b.

As shown in FIGS. 11 and 13, the horizontal portion 53a is provided with a plurality of second terminals 52 at a longitudinal side edge thereof. The second terminals 52 are spaced from each other by a predetermined distance and upwardly inclined. Each of the second terminals 52 is elastically deformable in the vertical direction. Such a terminal may be obtained from an L-shaped projection (see FIG. 11) integrally formed with the horizontal portion 53a. Specifically, the L-shaped projection includes a base portion directly connected to the horizontal portion 53a, and a free end portion extending from the base portion at the right angle. The free end portion is upwardly bent relative to the base portion, thereby providing a second terminal 52.

As shown in FIGS. 12 and 13, in an assembled state, the horizontal portion 53a of the outer shield member 5B is held in contact with the bottom surface of the printed circuit board 7, whereas the upright portion 53b of the outer shield member is held in contact with a first longitudinal side surface 16a of the container 1. As can be seen from FIG. 12, the first longitudinal side surface 16a is located closer to the light receiving elements than to the cold-cathode tube 3. The container 1 includes a second longitudinal side surface 16b opposite to the first longitudinal side surface 16a.

The outer shield member 5B is held in place by an attachment 99 shown by single-dot chain lines in FIG. 12. The attachment 99 may be prepared by pressworking a metal plate. As illustrated, the attachment 99 has a generally U-shaped sectional configuration and is provided with a plurality of first inward projections 99a (only one is shown) and a plurality of second inward projections 99b (only one is shown). Correspondingly, the first longitudinal side surface 16a of the container 1 is provided with a first groove 17a for engaging with the first inward projections 99a, whereas the second longitudinal side surface 16b is provided with a second groove 17b for engaging with the second inward projections 99b.

As best shown in FIG. 11, the upright portion 53b of the outer shield member 5B is provided with cutouts 54 for exposing part of the first groove 17a. These cutouts 54 are formed for allowing the first inward projections 99a to come into engagement with the first groove 17a (see also FIG. 12).

In an assembled state, the outer shield member 5B is held in place with its upright portion 53b and intermediate portion 53c sandwiched between the container 1 and the attachment 99, as shown in FIG. 12. The thus fixed outer shield member 5B is engaged with the bottom surface of the printed circuit board 7, so that the printed circuit board 7 is held in place within the third accommodating portion 15.

Here, it should be appreciated that the present invention is not limited to the above-described embodiment. For instance, the outer shield member 5B may be fixed to the container 1 by an adhesive. Alternatively, the container 1 and the outer shield member 5B may be provided with suitable projections and grooves to be brought into releasable engagement with each other.

When the outer shield member 5B is fixed to the container 1, the second terminals 52 of the outer shield member project upwardly via through-holes 18 formed in the container 1. As a result, the second terminals 52 are elastically pressed against the bottom surface 5c of the inner shield member 5A, rendering the outer shield member 5B to be electrically connected to the inner shield member 5A. In this manner, both of the inner and the outer shield members 5A and 5B are equally grounded.

Description will now be given to the function of the image reading apparatus Ab.

In order to actuate the image reading apparatus Ab, use may a be made of an inverter (not shown) connected to the connection cable 31 for supplying power to the cold-cathode tube 3. According to the third embodiment, however, the container 1 is not provided with any accommodating portion for the non-illustrated inverter. Thus, the inverter may be located at a suitable position outside of the container 1. For instance, the inverter may be arranged below or beside the container 1.

As previously stated, electrical noises may be generated at the inverter and/or the connection cable connected to the inverter. According to the third embodiment, such electrical noises generated outside of the container 1 are shielded by the outer shield member 5B and will not be allowed to reach the wiring pattern formed on the printed circuit board 7.

The cold-cathode tube 3 also may generate electrical noises while it is actuated. According to the third embodiment, such electrical noises are shielded by the inner shield member 5A, and therefore will not be able to reach the wiring pattern of the printed circuit board 7.

Electrical noises may be generated at components other than the inverter, the connection cable 31 and the cold-cathode tube 3. Noises from these components are also prevented from reaching the wiring pattern on the printed circuit board 7 due to the presence of the inner and the outer shield members 5A and 5B.

With the above arrangements, it is possible to keep electrical noises from adversely affecting the relatively weak image signals supplied from the light receiving elements 79. Thus, the weak signals can be sent intact to the non-illustrated amplifying circuit via the wiring pattern. In other words, according to the third embodiment, the information carried by the weak signals will not be damaged by electrical noises while the weak signals are being sent from the light receiving elements 79 to the non-illustrated amplifying circuit via the wiring pattern on the printed circuit board 7.

The outer shield member 5A, while serving to protect the weak signals from unwanted electrical noises, is also helpful in preventing the bottom surface of the printed circuit board 7 from being exposed to external light. With such an arrangement, the unwanted external light (which otherwise would pass through the circuit board 7 and reach the light receiving elements 79) will not be detected by the light receiving elements 79.

According to the third embodiment of the present invention, the inner shield member 5A and the outer shield member 5B can easily be grounded without using any specially prepared, wiring pattern. Specifically, when the inner shield member 5A is placed into the first accommodating portion 11 of the container 1, the inner shield member 5A is automatically grounded via the first terminals 5d which come into contact with the electrode pads 70 on the printed circuit board 7. On the other hand, when the outer shield member 5B is fixed to the container 1, the second terminals 52 of the shield member 5B come into contact with the inner shield member 5A, which is now grounded. As a result, the outer shield member 5B is also grounded via the inner shield member 5A.

Here, it should be appreciated that the first terminals 5d and the second terminals 52 are pressed against the electrode pads 70 and the inner shield member 5A, respectively, with a suitable restoring force. Thus, even when the inner shield member 5A and the outer shield member 5B are not properly fixed to the container 1, the first and the second terminals 5d, 52 will not be readily detached from the electrode pads 70 and the inner shield member 5A.

The first terminals 5a of the inner shield member 5A are arranged to be spaced from each other longitudinally of the inner shield member 5A. Similarly, the second terminals 52 of the outer shield member 5B are arranged at different locations along the outer shield member 5B. Thus, even when the first and the second shield members 5A, 5B are unduly inclined (positionally deviated) with respect to the container 1, at least one first terminal 5a and one second terminal 52 will advantageously be kept connected to a corresponding electrode pad 70 and the inner shield member 5A, respectively.

In the above-described third embodiment, the second terminals 5d are integrally formed with the outer shield member 5B.

However, the present invention is not limited to this embodiment. For instance, the second terminals 5d may be formed on the inner shield member 5A. In this case, by contacting the second terminals 5d with the outer shield member 5B, the outer shield member 5B will be grounded via the inner shield member 5A.

Reference will now be made to FIGS. 15–21 which illustrate an image reading apparatus Ac according to a fourth embodiment of the present invention. Differing from the previous embodiments, use is made of an LED (light-emitting diode) as a light source in the image reading apparatus Ac of the fourth embodiment.

Figure 18:
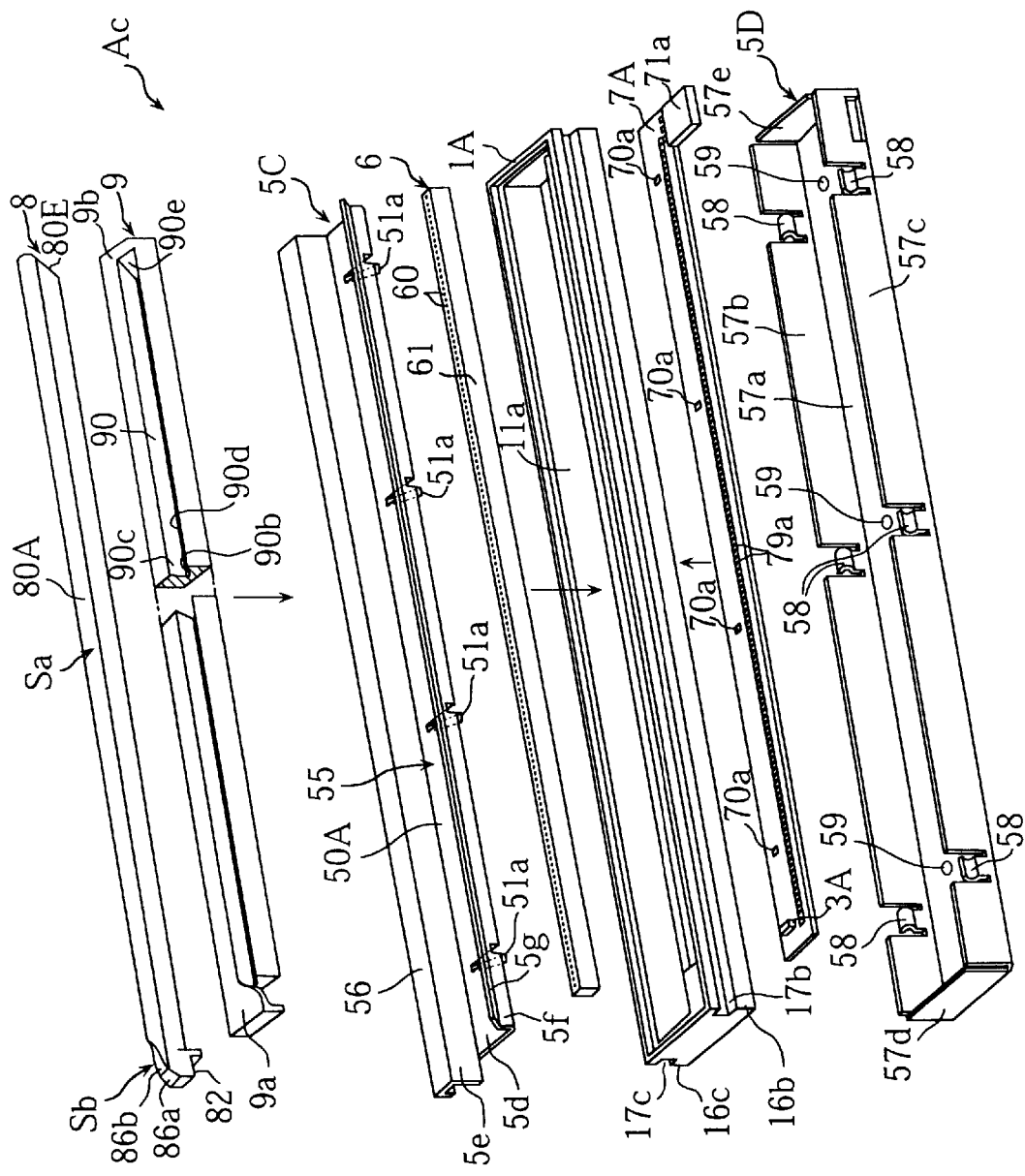
FIG. 18 is an explosive view showing components used for the image reading apparatus of the fourth embodiment.

As shown in FIG. 18, the image reading apparatus Ac includes a container 1A, a lens array 6, a printed circuit board 7A carrying a plurality of light receiving elements 79a, an LED light source 3A mounted on the circuit board 7A, a light-guiding member 8, a reflector 8, an inner shield member 5C and an outer shield member 5D.

The light-guiding member 8 is a transparent, elongated component which may be made of an acrylic resin such as PMMA [poly(methyl methacrylate)]. The light-guiding member 8 is provided for effectively guiding the light emitted from the light source 3A to an image reading section P.

Figure 19:
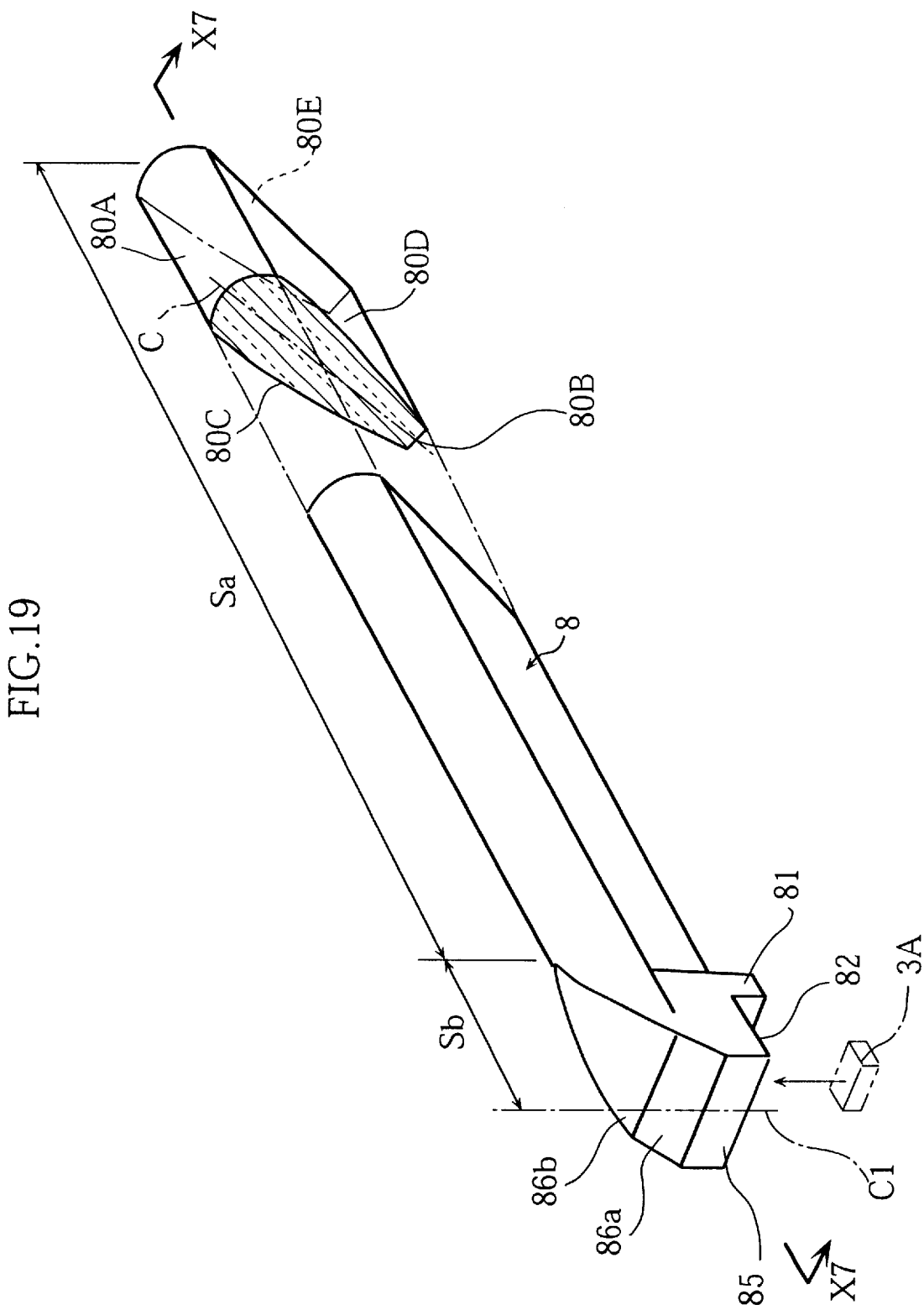
FIG. 19 is a schematic view showing a light-guiding member used for the image reading apparatus of the fourth embodiment.

As shown in FIG. 19, the light-guiding member 8 is divided into two sections 5a and 5b. The first section 5a has a uniform cross section, whereas the cross section of the second section 5b differs at positions.

The first section 5a of the light-guiding member 8 includes a head surface (light-emitting surface) 80A, a bottom surface 80B opposite to the head surface 80A, a first side surface 80C and a second side surface 80D. The head surface 80A, the first side side surface 80C and the second side surface 80D are rendered smooth like a mirror.

Here, it should be noted that light will be totally reflected when the light meets a smooth surface of an object at an angle greater than the critical angle. On the other hand, when the light meets the smooth surface at an angle smaller than the critical angle, the light will pass through them. As is well known, the critical angle depends, roughly speaking, on the material of the above-mentioned object.

The bottom surface 80B is formed with a plurality of grooves 84 for scattering light. Each of the grooves 84 has an arcuate cross section. The bottom surface 80B is also provided with smooth portions 84' between adjacent grooves 84 (see FIG. 20). For the purpose of scattering light, a plurality of protrusions may be formed on the bottom surface 80B at predetermined intervals. Alternatively, a paint capable of scattering light may be applied over the bottom surface 80B, or the bottom surface 80B may entirely or partially be roughened.

Figure 21:
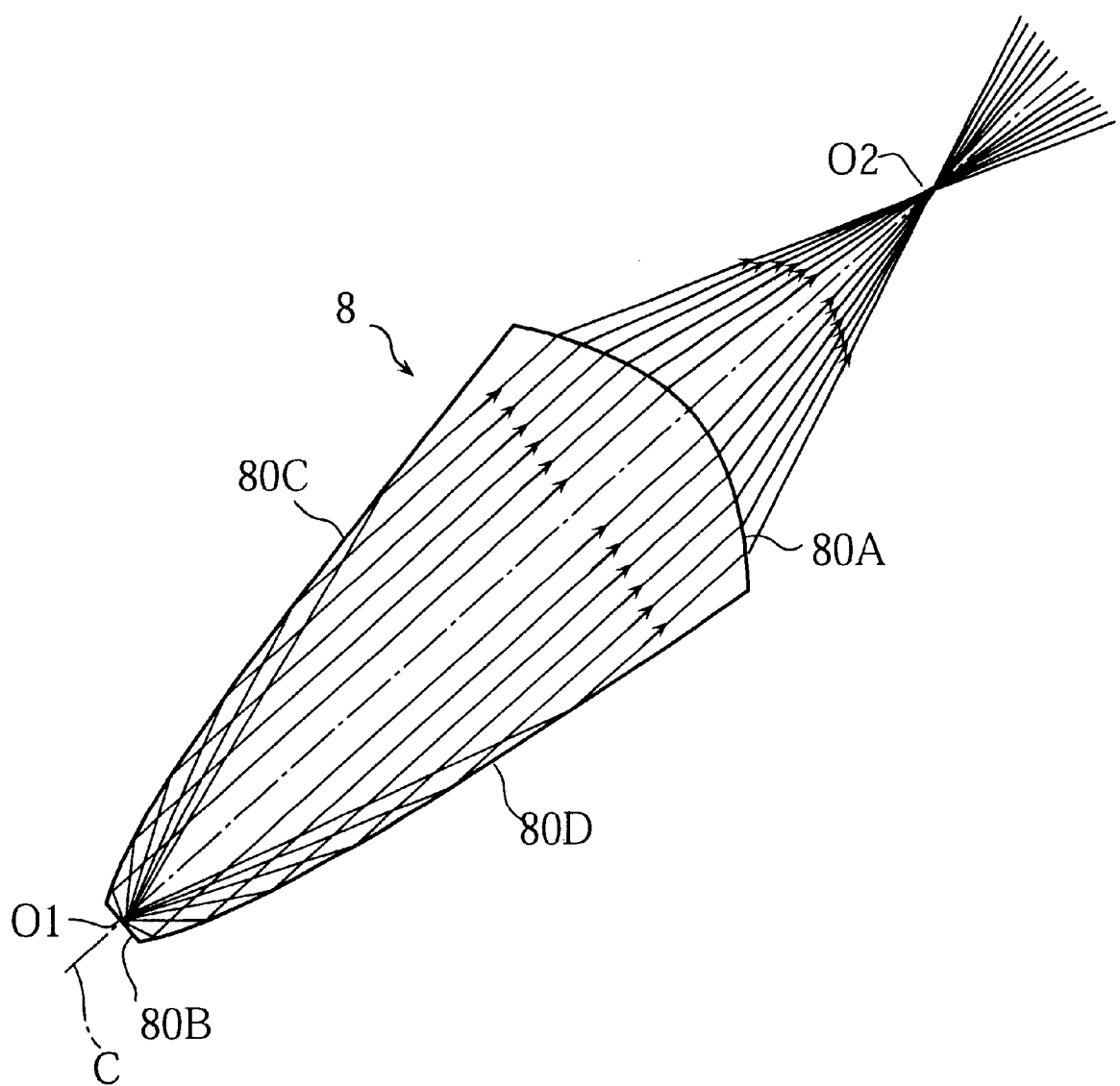
FIG. 21 shows a cross-sectional configuration of the light-guiding member used for the fourth embodiment.
Figure 22:
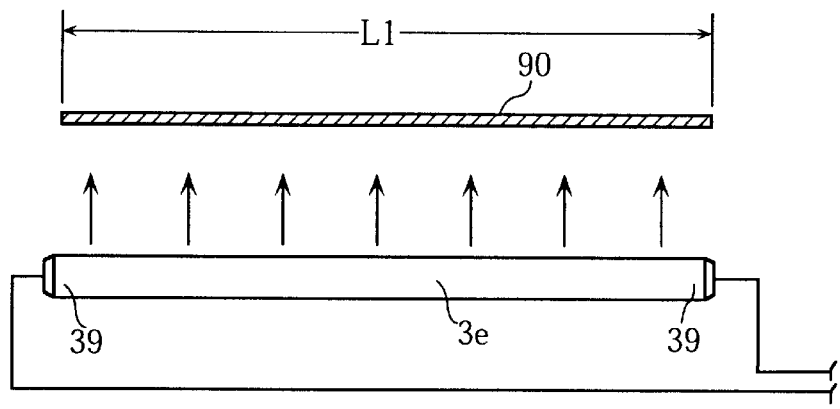
FIG. 22 shows an arrangement of a conventional cold-cathode tube.
Figure 23:
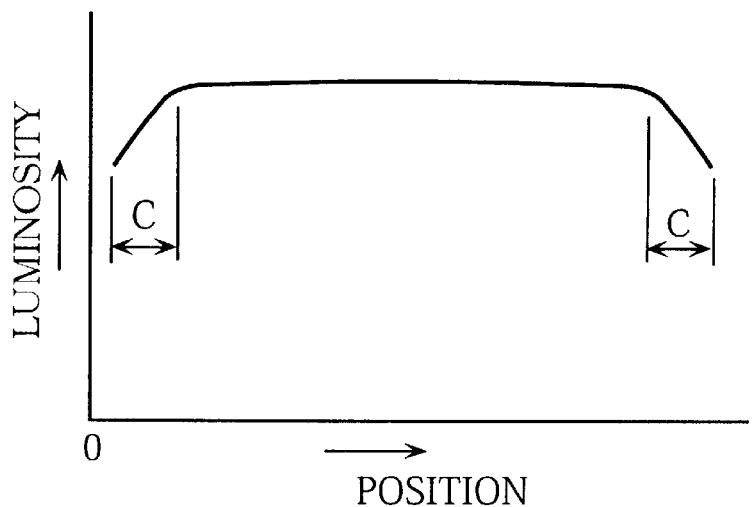
FIG. 23 is a graph showing a relationship between relative luminosity and longitudinal positions of the conventional cold-cathode tube.
Figure 24:
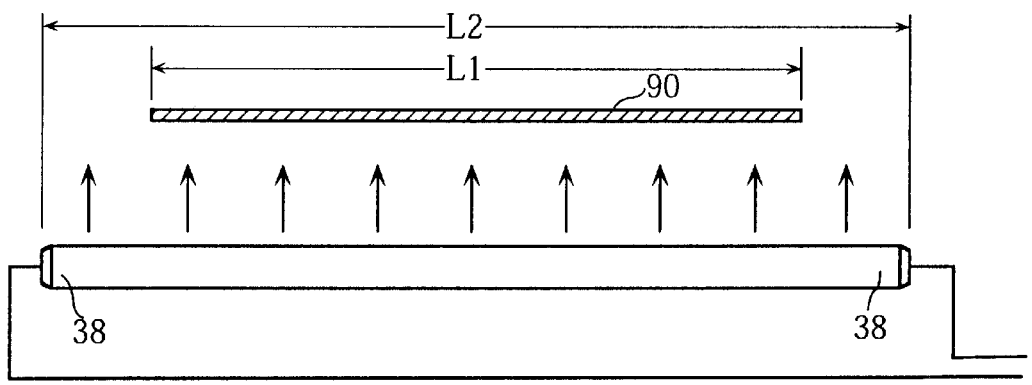
FIG. 24 shows an arrangement of another conventional cold-cathode tube.

As shown in FIG. 21 illustrating the cross-sectional view of the light-guiding member 8, the head surface 80A, the first side surface 80C and the second side surface 80D are curved, whereas the bottom surface 80B is flat.

More specifically, the head surface 80A is shaped like a convex lens, so that light passing through the head surface 80A will converge on a predetermined point O2. The first side surface 80C and the second side surface 80D are symmetrical with respect to a center line C, thereby defining a parabolic configuration. The flat bottom surface 80B, which is much smaller in width than the head surface 80A, extends through or close to the focus O1 of the parabola.

With such an arrangement, light rays starting from the focus O1 will be reflected in the same direction when they meet the parabolic side surfaces 80C and 80D, as shown in FIG. 21.

Referring back to FIG. 19, the light-guiding member 8 includes a first end surface 80E and a second end surface 85 opposite to the first end surface 80E. The second section 5b of the light-guiding member 8 has two inclined portions 86a and 86b. Of these portions, the first inclined portion 86a is a plain and connected to the second end surface 85, whereas the second inclined portion 86b is slightly curved (see also FIG. 20).

As can be seen from FIG. 19, the center line C of the first section 5a is inclined with respect to a center line C1 which extends vertically through the second section 5b. In this manner, the head surface 80A is advantageously directed toward the image reading section P (see FIG. 16).

Figure 20:
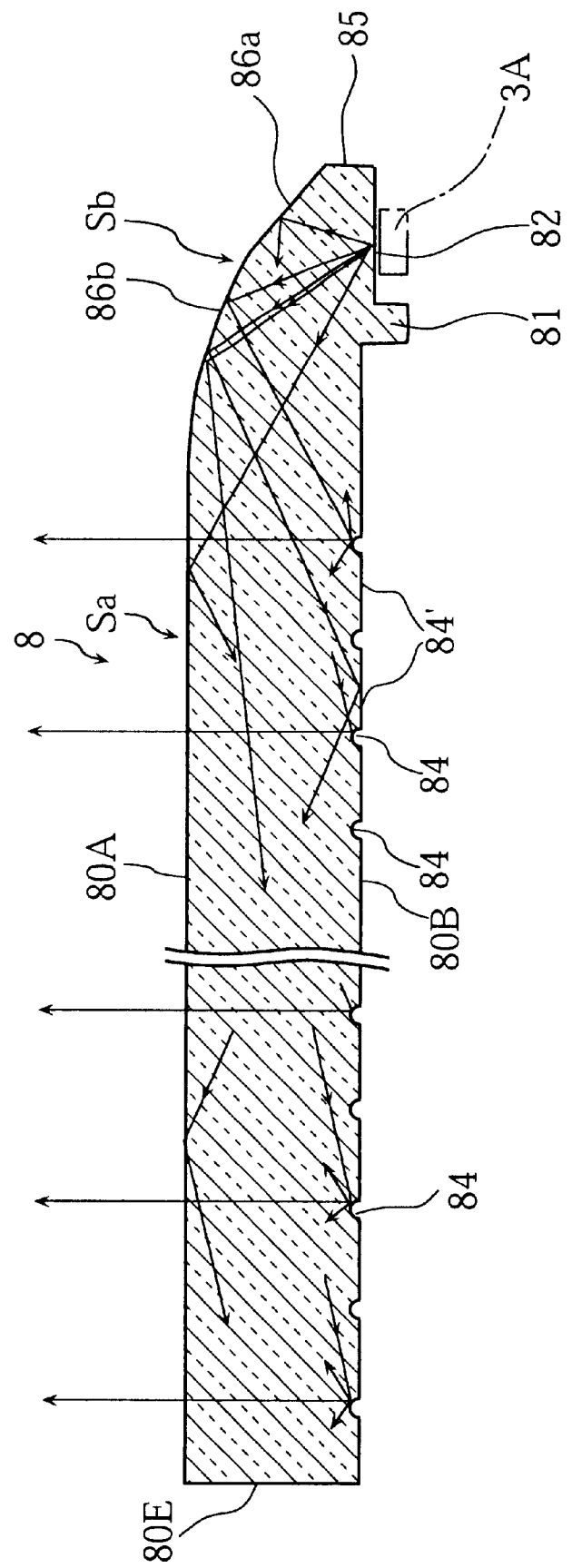
FIG. 20 is a sectional view taken along lines X7—X7 in FIG. 19.

As shown in FIG. 20, the illustrated light-guiding member 8 is provided with a light introducing surface 82 which is arranged immediately above the light source 3A. Thus, the light emitted from the light source 3A enters the light-guiding member 8 via the light introducing surface 82 and is reflected on the first and the second inclined portions 86a, 86b.

Figure 15:
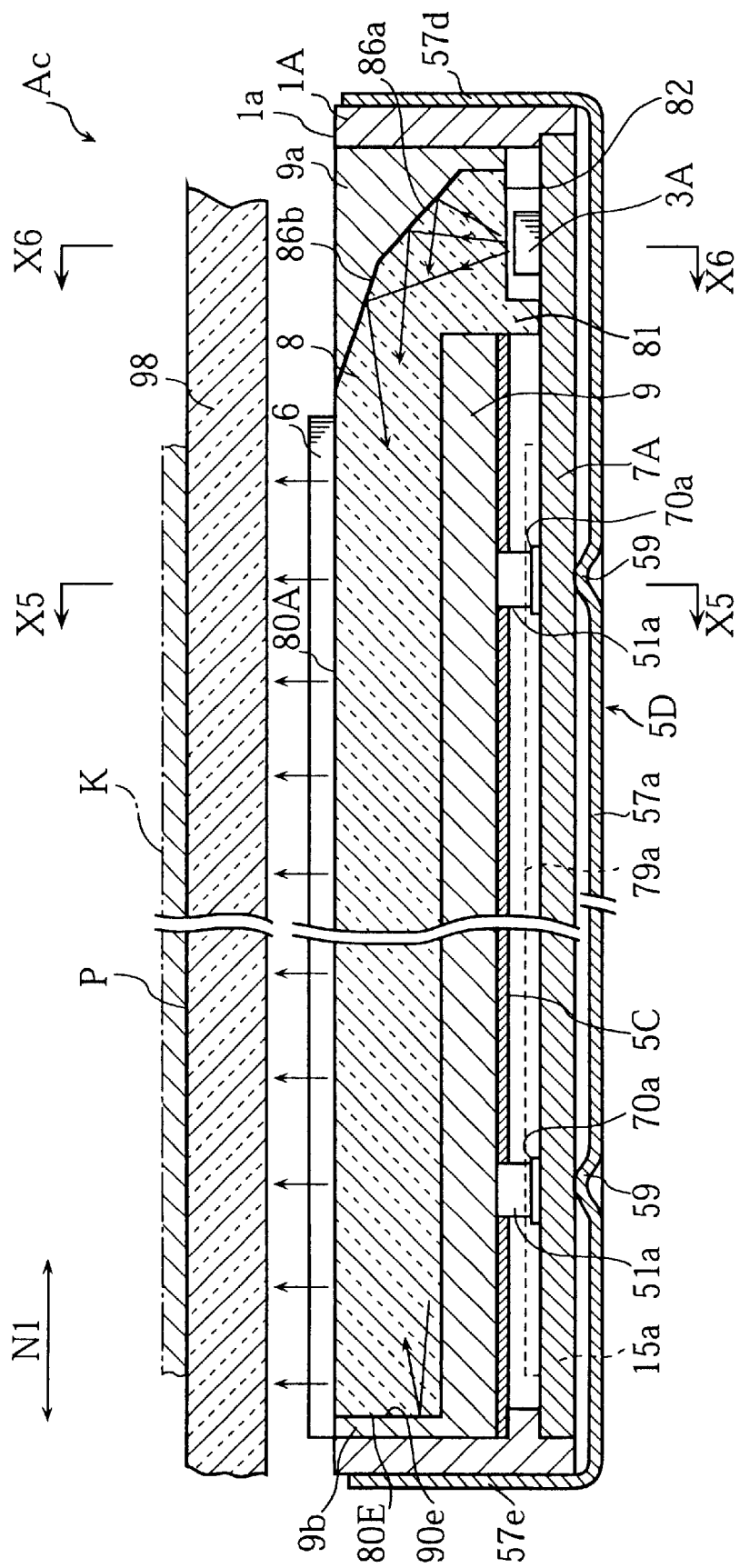
FIG. 15 is a sectional view showing an image reading apparatus according to a fourth embodiment of the present invention.

The second section 5b of the light-guiding member 8 is provided with a protrusion 81 adjacent to the light introducing surface 82, as shown in FIGS. 15 and 20. The protrusion 81 projects downwardly from the second section 5b and has a predetermined length appropriate for allowing the presence of the light source 3A between the light introducing surface 82 and the printed circuit board 7A.

After the light from the light source 3A is reflected on the first and the second inclined portions 86a, 86b, the light will propagate through the light-guiding member 8 toward the first end surface 80E (i.e., in the longitudinal direction of the light-guiding member 8).

While the light is traveling in the longitudinal direction of the guiding member 8, it may repeatedly be totally reflected on the surfaces 80A–80D. However, when the light comes to the grooves 84 in the bottom surface 80B, it will be scattered, as shown in FIG. 20. Thus, most of the light reaching the bottom surface 80B tends to be directed upwardly or toward the first side surface 80C and the second side surface 80D.

The upwardly propagating light is totally reflected on the first side surface 80C or the second side surface 80D. As previously stated with reference to FIG. 21, the reflected light will go toward the head surface 80A along a line extending in parallel to the center line C . Then, the light leaves the light-guiding member 8 via the head surface 80A and is converged on the predetermined point O2.

As viewed longitudinally of the first section Sa of the light-guiding member 8 (see FIG. 20), the above-described phenomenon takes place at any location of the first section 5a with a substantially equal frequency. Thus, even though the light source 3A is arranged adjacent to an end portion of the light-guiding member 8, every portion of the image reading section P can be irradiated with an equal luminous energy.

Figure 16:
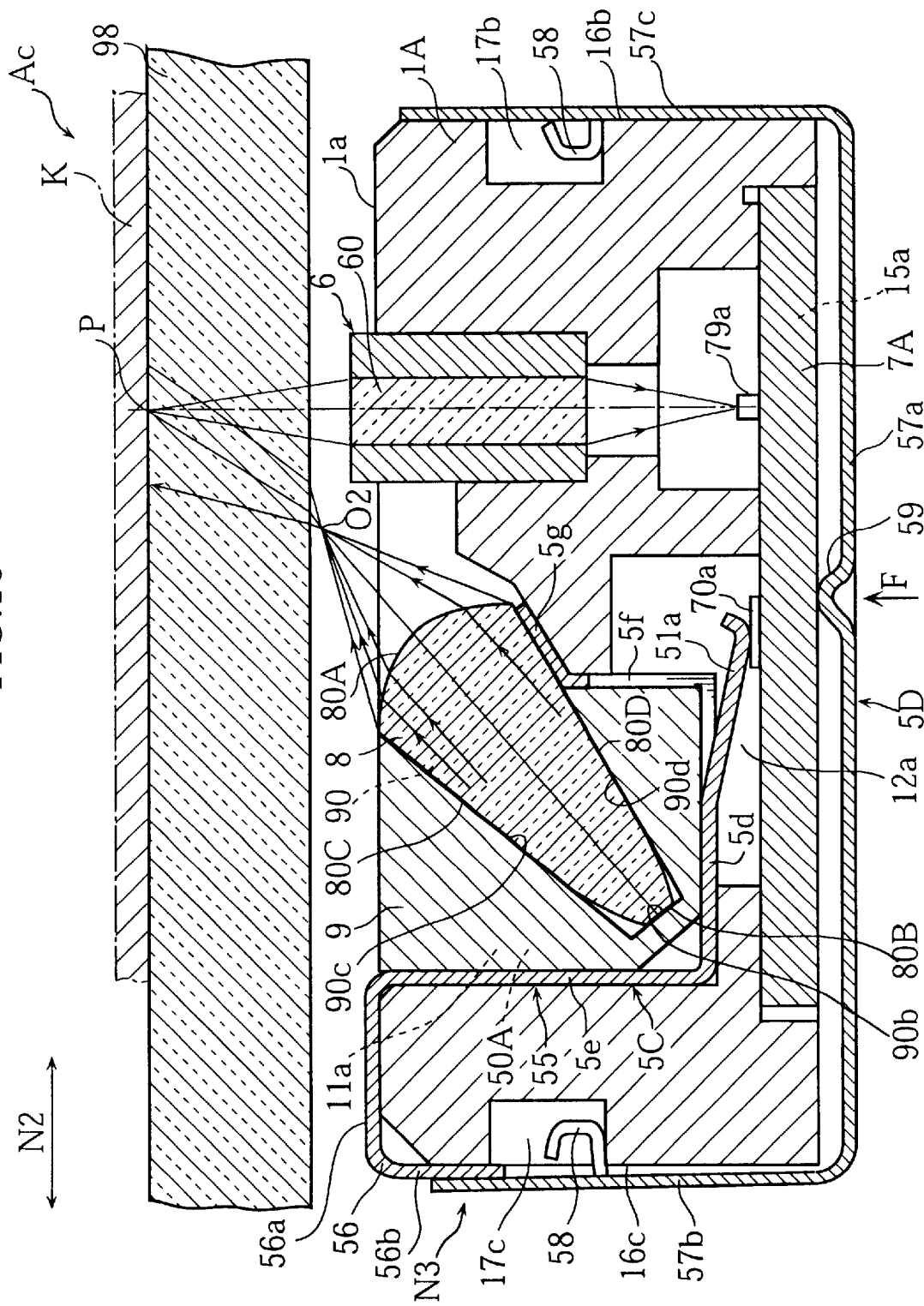
FIG. 16 is a sectional view taken along lines X5—X5 in FIG. 15.

The reflector 9 supports the light-guiding member 8 and is generally equal in length to the light-guiding member 8 (see FIG. 15). As shown in FIGS. 16 and 18, the reflector 9 is formed with a groove 90 which extends longitudinally of the reflector. The light-guiding member 8 is fitted into the groove 90. As best shown in FIG. 16, the groove 90 is defined by a bottom wall 90b, a first inner wall 90c and a second inner wall 90d of the reflector 9. The bottom wall 90b is held in contact with the bottom surface 80B of the light-guiding member 8. Similarly, the first inner wall 90c is held in contact with the first side surface 80C of the light-guiding member 8, whereas the second inner wall 90d is held in contact with the second side surface 80D of the light-guiding member. Since the above three surfaces of the light-guiding member 8 are covered by the reflector 9, it is possible to prevent the light propagating through the light-guiding member 8 from coming out of the light-guiding member prematurely.

As shown in FIGS. 15 and 18, the reflector 9 has a first end 9a provided with a cover portion. This cover portion closely covers the second section 5b of the light-guiding member 8 (see FIG. 15). The reflector 9 also has a second end 9b opposite to the first end 9a. The second end 9b is provided with an upright end wall 90e for closely covering the first end surface 80E. With such an arrangement, the light propagating through the light-guiding member 8 is prevented from prematurely coming out from the second section 5b or from the first end surface 80E.

The reflector 9 may be made of a white synthetic resin material, and its surfaces facing the light-guiding member 8 may be rendered smooth enough to reflect light effectively. In the fourth embodiment described above, the reflector 9 itself is a single unit. However, the present invention is not limited to this embodiment. For instance, the above-mentioned cover portion of the reflector 9 may be prepared separately from the remaining portion of the reflector.

The inner shield member 5C may be prepared by press-working a thin plate made of a conductive metal such as stainless steel. The inner shield member 5C is generally equal in length to the reflector 9. As shown in FIG. 18 for example, the inner shield member 5C includes an upwardly open, primary portion 55 which defines a groove 50A for accommodating the reflector 9 (see FIG. 16). The inner shield member 5C also includes a secondary portion (auxiliary portion) 56 connected to the primary portion 55.

As seen in FIG. 16, the primary portion 55 includes a bottom plate 5d, a first upright wall 5e, a second upright wall 5f and an inclined wall 5g. The first and the second upright walls 5e, 5f extend upwardly from the respective longitudinal edges of the bottom plate 5d. The inclined wall 5g extends from the upper edge of the first upright wall 5f at a predetermined angle.

The secondary portion 56 is connected to the upper edge of the first upright wall 5e. As shown in FIG. 16, the secondary portion 56 includes a horizontal plate 56a and a vertical wall 56b extending downward from the horizontal plate 56a.

The bottom plate 5d is provided with a plurality of first terminals 51a extending obliquely downward. As shown in FIG. 16, in an assembled state, the first terminals 51a are held in contact with electrode pads 70a on the printed circuit board 7A for grounding purpose. In the fourth embodiment again, the first terminals 51a are pressed against the pads 70a with a suitable urging force.

As seen in FIG. 16, the container 1A is formed with an upwardly open, first accommodating portion 11a into which the primary portion 55 of the inner shield member 5C is fitted. Under the first accommodating portion 11a, a plurality of bores 12a are provided for allowing the first terminals 51a to project downwardly.

The printed circuit board 7A carries a connector 71a (see FIG. 18). The upper surface of the printed circuit board 7A is formed with a predetermined wiring pattern (not shown) connected to the connector 71a. The wiring pattern is also connected to the light receiving elements 79a. The printed circuit board 7A is fitted into a downwardly open, accommodating portion 15a formed in the container 1A, as shown in FIG. 15 for example.

The light source 3A may be made up of an LED chip enclosed by a resin package. For reading out monochromic images (i.e., images printed in black only), use is made of one kind of LED capable of emitting while light or a single color light. For reading out color images, three kinds of LEDs (red, green and blue) may be used. However, it is also possible to use a single LED capable of emitting white light for reading out color images. When plural LEDs are used, they may be enclosed together in a common package to be mounted on the printed circuit board 7A. When the light source 3A is capable of emitting red, green and blue light, the light receiving elements 79a do not need to be provided with color filters (R, G, B).

Like the inner shield member 5C, the outer shield member 5D may also be prepared by pressworking a thin plate made of a conductive metal such as stainless steel. As shown in FIG. 18, the outer shield member 5D is an upwardly open, box-like component. The outer shield member 5D includes a rectangular bottom plate 57a, a first side wall 57b, a second side wall 57c opposite to the first side wall 57b, a first end wall 57d and a second end wall 57e opposite to the first end wall 57d. These side walls 57b, 57c and end walls 57d, 57e extend from the bottom plate 57a at the right angle.

Figure 17:
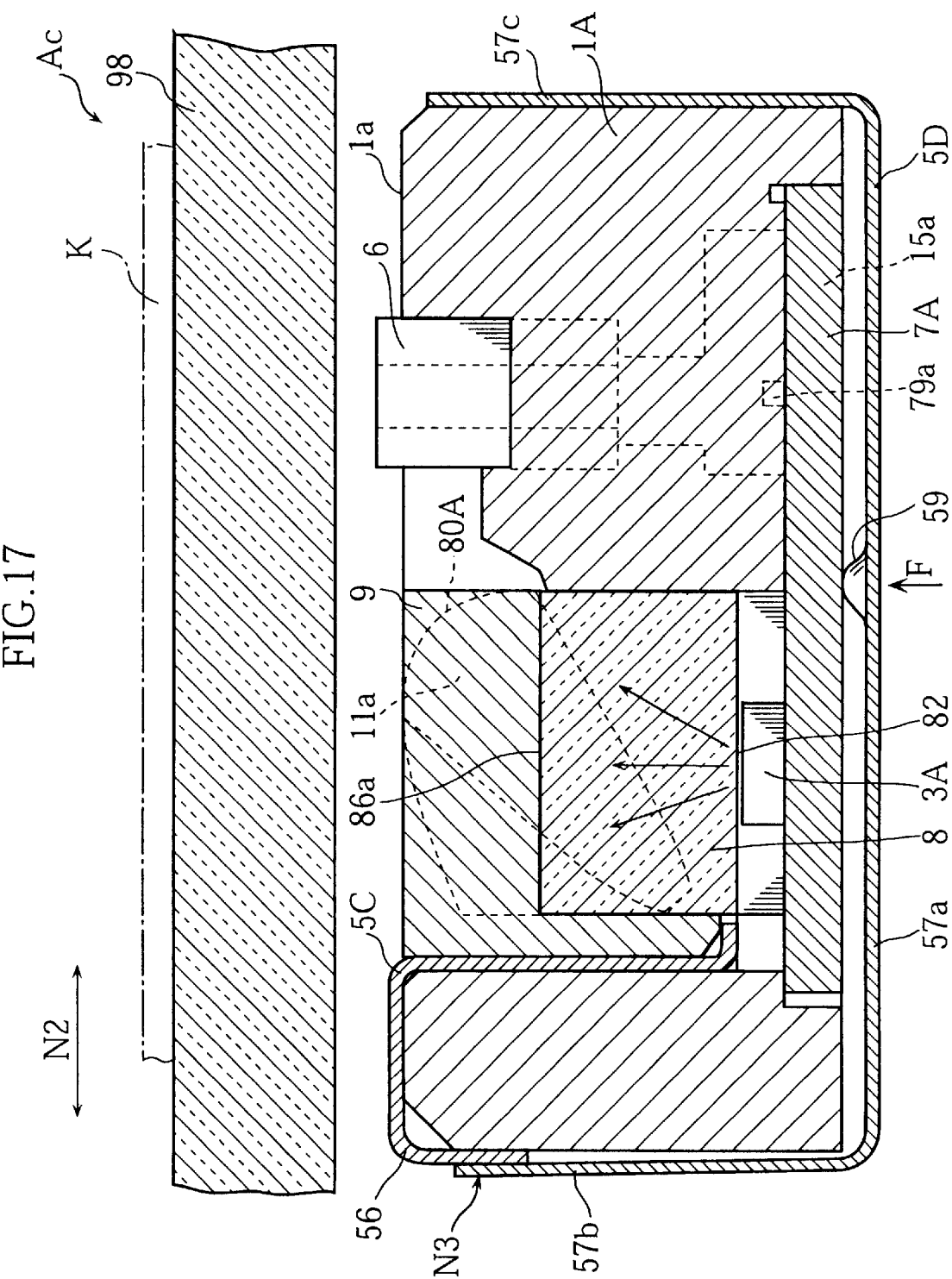
FIG. 17 is a sectional view taken along lines X6—X6 in FIG. 15.

As shown in FIGS. 15–17, the container 1A is fitted into the box-like outer shield member 5D. In an assembled state, the container 1A is entirely covered by the outer shield member 5D except for the upper portion 1a of the container.

As shown in FIGS. 16 and 17, the first side wall 57b of the outer shield member 5D overlaps the secondary portion 56 of the inner shield member 5C (the overlapped area is indicated by an arrow N3). Specifically, the vertical wall 56b of the secondary portion 56 is arranged to extend on a longitudinal side surface 16c of the container 1A. Under these circumstances, the first side wall 57b of the outer shield member 5D extends onto the vertical wall 56b. As a result, the outer shield member 5D is electrically connected to the inner shield member 5C (this means that the outer shield member 5D is also grounded).

With the above arrangement, the inner and the outer shield members 5C, 5D are electrically connected to each other via a large contact area. In this manner, the outer shield member 5D can be brought into a reliable grounding condition.

As shown in FIGS. 16 and 18, each of the first and second side walls 57b, 57c is provided with a plurality of engaging projections 58. Correspondingly, the longitudinal side surface 16b and the opposite side surface 16c of the container 1A are formed with engaging grooves 17b and 17c, respectively. With such an arrangement, by bringing the engaging projections 58 of the outer shield member 5D into engagement with the above grooves 17b and 17c, the outer shield member 5D is fixed to the container 1A.

When the outer shield member 5D is attached to the container 1A, the bottom plate 57a of the outer shield member faces the bottom surface of the printed circuit board 7A while applying an upward pressing force F (FIGS. 16–17) to the printed circuit board. In this manner, the printed circuit board 7A is reliably fixed to the container 1A. For ensuring the application of the pressing force from the outer shield member 5D to the printed circuit board 7A, a suitable number of protrusions 59 are formed on the bottom plate 57a of the outer shield member 5D.

Description will now be given to the function of the image reading apparatus Ac.

In the image reading apparatus Ac of the fourth embodiment, the container 1A (except for the upper portion 1a) is wholly enclosed by the outer shield member 5D. In this manner, it is possible to prevent, to a great extent, electrical noises generated outside of the container 1A from reaching the inside of the container. Thus, the relatively weak image signals supplied from the light receiving elements 79a will not be adversely influenced by the electrical noises.

Further, according to the fourth embodiment, electrical noises coming from above the container 1A can be shielded by the inner shield member 5C arranged above the printed circuit board 7A. In this connection, it should be noted that the inner shield member 5C is arranged close to the printed circuit board 7A. Thus, the external electrical noises will reliably be caught by the inner shield member 5C before they can reach the printed circuit board 7A.

In the fourth embodiment, no shield member is provided above the light receiving elements 79a. This is because, under normal circumstances, no components or devices which may generate electrical noises are not disposed above the light receiving elements 79a. Further, the LED light source 3A does not generate unwanted electrical noises. Thus, there will be no problem even when the LED light source 3A is not shielded.

In the image reading apparatus Ac, as previously described, the primary portion 55 of the inner shield member 5C is fitted into the first accommodating portion 11a of the container 1A, while the light-guiding member 8 and the reflector 9 are accommodated in the groove 50A of the inner shield member 5C. In this manner, the primary portion 55, the light-guiding member 8 and the reflector 9 can be held compactly in the container 1A. At the same time, the inner shield member 5C can have a large surface area.

Further, in the image reading apparatus Ac, use is made of the light-guiding member 8 for causing light to be uniformly distributed. Thus, there is no need to use a plurality of LED light sources to properly irradiate the elongated image reading section P.

Still further, the head surface 80A of the light-guiding member 8 is arranged to converge the light going out of the light-guiding member. Thus, the image reading section P can be irradiated with an appropriate amount of light even when only one light source is provided. In this connection, the bottom surface 80B, the first side surface 80C and the second side surface 80D of the light-guiding member 8 are covered by the reflector 9. Thus, as previously described, the light propagating through the light-guiding member 8 is prevented from going out prematurely from the above-mentioned three surfaces, whereby the image reading section P can be irradiated more properly.

In the fourth embodiment, the outer shield member 5D is formed to have an upwardly open, box-like configuration (FIG. 18). However, such an arrangement is not limitative, and the outer shield member 5D may have a different configuration. For instance, the first end wall 57d and the second end wall 57e may be removed.

Further, in the fourth embodiment, the inner shield member 5C is disposed between the lens array 6 and the side surface 16c of the container 1A. The present invention is not limited to this example. Still further, the inner shield member 8 may be formed as a planar component, instead of being bent several times.

The above-described image reading apparatus (A, Ab, Ac, Ad) of the first to the fourth embodiments are depicted as a flat-bed type image sensor. However, the present invention is also applicable to a contact type image sensor which includes, among other things, a paper feeding platen roller for feeding a document paper. Further, the present invention is also applicable to a hand-held type scanner which is manually supported by a user and is moved in the secondary scanning direction.

The present invention being thus described, it is obvious that the same may be varied in many other ways. Such variations should not be regarded as a departure from the spirit and scope of the present invention, and all such modifications as would be obvious to those skilled in the art are intended to be included within the scope of the following claims.

What is claimed is:

1. An image reading apparatus comprising:
    a cold-cathode tube for irradiating a linearly extending image reading section, the cold-cathode tube including a first end portion, a second end portion, and an intermediate portion arranged between the first end portion and the second end portion;

an inverter for supplying power to the cold-cathode tube;

a plurality of light receiving elements for receiving light reflected at the image reading section; and a lens array for focusing the reflected light onto the light receiving elements;

wherein each of the first and the second end portions extends in a direction differing from another direction in which the intermediate portion extends, the intermediate portion being longer than the first and the second end portions;

wherein the lens array is disposed in a region defined by the first end portion, the second end portion and the intermediate portion; and wherein the lens array is disposed between the inverter and the intermediate portion.

2. An image reading apparatus comprising:

a light source for irradiating an image reading section;

a plurality of light receiving elements for receiving light reflected at the image reading section;

a printed circuit board having an upper surface for mounting the light receiving elements and a lower surface opposite to the upper surface;

a container for accommodating the light source and the printed circuit board;

an outer shield member which is grounded and externally attached to the container; and an inner shield member which is accommodated in the container and electrically connected to the outer shield member.

3. The image reading apparatus according to claim 2, wherein the light source comprises a cold-cathode tube, the inner shield member being arranged between the cold-cathode tube and the printed circuit board.

4. The image reading apparatus according to claim 3, further comprising a reflector for supporting the cold-cathode tube, wherein the inner shield member defines a groove for accommodating the reflector.

5. The image reading apparatus according to claim 4, wherein the container is formed with a first hollow portion for accommodating the inner shield member.

6. The image reading apparatus according to claim 2, further comprising a light-guiding member for leading light from the light source to the image reading section, and a reflector for supporting the light-guiding member.

7. The image reading apparatus according to claim 6, wherein the light source comprises a light-emitting diode mounted on the upper surface of the printed circuit board.

8. The image reading apparatus according to claim 6, wherein the light-guiding member includes a plurality of side surfaces arranged to totally reflect light propagating through the light-guiding member.

9. The image reading apparatus according to claim 8, wherein the light-guiding member also includes a light-emitting surface for allowing the propagating light to leave the light-guiding member.

10. The image reading apparatus according to claim 2, wherein the outer shield member is arranged to cover the lower surface of the printed circuit board.

11. The image reading apparatus according to claim 2, wherein the outer shield member has an upwardly open, box-like configuration.

12. The image reading apparatus according to claim 2, wherein the container is formed with a second hollow portion for accommodating the printed circuit board, the outer shield member being arranged to come into contact with the lower surface of the printed circuit board so that the printed circuit board is kept within the second hollow portion.

13. The image reading apparatus according to claim 2, wherein the printed circuit board is provided with an electrode for grounding, the inner shield member being electrically connected to the electrode for grounding, the outer shield member being electrically connected to the inner shield member.

14. The image reading apparatus according to claim 13, wherein the inner shield member is formed with a first terminal projecting from the inner shield member, the first terminal being elastically pressed against the electrode for grounding.

15. The image reading apparatus according to claim 14, the outer shield member is formed with a second terminal projecting from the outer shield member, the second terminal being elastically pressed against the inner shield member.

16. The image reading apparatus according to claim 14, wherein the inner shield member is provided with an auxiliary portion extending externally of the container, the auxiliary portion being held in contact with the outer shield member.

* * * * *